(12) United States Patent
Yamada et al.

(10) Patent No.: US 9,428,139 B2
(45) Date of Patent: Aug. 30, 2016

(54) AIRBAG DEVICE FOR FRONT PASSENGER SEAT

(71) Applicant: TOYODA GOSEI CO., LTD., Kiyosu-shi, Aichi-ken (JP)

(72) Inventors: Ikuo Yamada, Kiyosu (JP); Takanori Komatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/950,111

(22) Filed: Nov. 24, 2015

(65) Prior Publication Data

US 2016/0159311 A1 Jun. 9, 2016

(30) Foreign Application Priority Data

Dec. 3, 2014 (JP) ................. 2014-245387

(51) Int. Cl.
*B60R 21/233* (2006.01)
*B60R 21/2342* (2011.01)
*B60R 21/205* (2011.01)
*B60R 21/268* (2011.01)
*B60R 21/263* (2011.01)
*B60R 21/00* (2006.01)

(52) U.S. Cl.
CPC .......... *B60R 21/233* (2013.01); *B60R 21/205* (2013.01); *B60R 21/2342* (2013.01); *B60R 21/263* (2013.01); *B60R 21/268* (2013.01); *B60R 2021/0004* (2013.01); *B60R 2021/0009* (2013.01); *B60R 2021/23308* (2013.01)

(58) Field of Classification Search
CPC . B60R 21/233; B60R 21/205; B60R 21/263; B60R 21/268; B60R 2021/23308
See application file for complete search history.

(56) References Cited

U.S. PATENT DOCUMENTS

| 4,262,931 | A | * | 4/1981 | Strasser | ................ | B60R 21/233 280/729 |
| 5,129,675 | A | * | 7/1992 | Wang | ................... | B60R 21/233 280/743.1 |
| 5,380,038 | A | * | 1/1995 | Hawthorn | ............. | B60R 21/233 280/730.1 |
| 5,609,363 | A | * | 3/1997 | Finelli | .................... | B60R 21/231 280/730.1 |
| 9,150,186 | B1 | * | 10/2015 | Belwafa | ................ | B60R 21/233 |
| 9,162,645 | B2 | * | 10/2015 | Cho | ....................... | B60R 21/205 |
| 2015/0158452 | A1 | * | 6/2015 | Choi | ..................... | B60R 21/233 280/732 |
| 2015/0166002 | A1 | * | 6/2015 | Fukawatase | .......... | B60R 21/233 280/730.1 |
| 2015/0258959 | A1 | * | 9/2015 | Belwafa | ................ | B60R 21/233 280/729 |

(Continued)

FOREIGN PATENT DOCUMENTS

JP 02-303951 A 12/1990
JP 08-324373 A 12/1996

*Primary Examiner* — Faye M Fleming
(74) *Attorney, Agent, or Firm* — Posz Law Group, PLC

(57) ABSTRACT

An airbag for an airbag device for a front passenger seat is housed in a housing in the shape of a folded-up body in front of a front passenger seat. The airbag includes a main bag section that includes at the rear plane as deployed a front-collision arresting plane for catching a passenger as moves forward and an auxiliary bag section that protrudes rearward out of the front-collision arresting plane. The lateral of the auxiliary bag section facing towards the front-collision arresting plane serves as an oblique-collision arresting plane for catching the passenger as moves diagonally forward, The folded-up body of the airbag includes a means for temporarily jointing the auxiliary bag section in a folded up configuration to the main bag section and preventing the auxiliary bag section from protruding out of the front-collision arresting plane in an initial stage of airbag deployment.

13 Claims, 15 Drawing Sheets

(56) References Cited

U.S. PATENT DOCUMENTS

| | | | | |
|---|---|---|---|---|
| 2015/0307055 A1* | 10/2015 | Cheng | ............... | B60R 21/203 280/728.3 |
| 2015/0307056 A1* | 10/2015 | Cheng | ............... | B60R 21/231 280/729 |
| 2015/0343986 A1* | 12/2015 | Schneider | ............ | B60R 21/205 280/729 |
| 2015/0367802 A1* | 12/2015 | Fukawatase | .......... | B60R 21/205 280/732 |
| 2016/0046254 A1* | 2/2016 | Yamada | ................ | B60R 21/233 280/729 |
| 2016/0046257 A1* | 2/2016 | Yamada | .............. | B60R 21/2338 280/729 |
| 2016/0059817 A1* | 3/2016 | Umehara | ............... | B60R 21/233 280/729 |

* cited by examiner

AIRBAG DEVICE FOR FRONT PASSENGER SEAT

CROSS REFERENCE TO RELATED APPLICATIONS

The present application claims priority from Japanese Patent Application No. 2014-245387 of Yamada at al., filed on Dec. 3, 2014, the entire disclosure of which is incorporated herein by reference.

BACKGROUND OF THE INVENTION

1. Field of the Invention

The present invention relates to an airbag device for a front passenger seat whose airbag is deployable for catching a passenger (especially, his head) seated in the front passenger seat not only in the event of a frontal collision of a vehicle at which the passenger moves forward, but also in the event of an oblique collision of a vehicle at which the passenger moves diagonally forward in a left and right direction such as towards the driver's seat or towards an outboard direction.

2. Description of Related Art

As disclosed in JPH02-303951 A and JPH08-324373 A, by way of example, a known airbag device for a front passenger seat includes in its airbag, a main bag section which is inflatable in front of a passenger seated in the front passenger seat and an auxiliary bag section which is disposed at a region of the main bag section facing toward the driver's seat and deployable rearward. In this airbag, the rear face of the main bag section serves as a front-collision arresting plane for arresting the passenger moving forward at frontal collision of a vehicle while a side face of the auxiliary bag section facing toward the front-collision arresting plane serves as an oblique-collision arresting plane for catching the passenger moving forward at oblique collision (including also an offset collision not only an instance where the vehicle crashes while moving diagonally forward).

In the conventional airbag device for a front passenger seat, the airbag is stored in a storage area disposed in front of the front passenger seat and is deployable therefrom rearward when fed with an inflation gas. The auxiliary bag section with a certain volume is disposed on either left or right side of the rear face of the main bag section. With this configuration, when the airbag device is actuated and the auxiliary bag section is fed with an inflation gas, the airbag is likely to oscillate in a left and right direction, which is likely to cause a delay in airbag deployment in front of the front passenger seat.

SUMMARY OF THE INVENTION

An object of the present invention is to provide an airbag device for a front passenger seat that is able to prevent the airbag from oscillating in a left and right direction during deployment and bring the airbag to full deployment quickly.

The airbag device for a front passenger seat of the invention includes a housing adapted to be mounted in front of a front passenger seat of a vehicle and an airbag which is housed in the housing in a folded-up configuration, as a folded-up body, The airbag is inflatable with an inflation gas to emerge out of the housing and be deployed rearward. The airbag includes a main bag section that includes at a rear plane thereof as deployed a front-collision arresting plane for catching a passenger as moves forward, and an auxiliary bag section that is deployable in such a manner as to protrude rearward out of either a left region or a right region of the front-collision arresting plane. The auxiliary bag section includes on its lateral extending from the front-collision arresting plane and facing towards the front-collision arresting plane an oblique-collision arresting plane for catching the passenger as moves diagonally forward. The folded-up body includes a holding means for preventing the auxiliary bag section from protruding out of the front-collision arresting plane in an initial stage of airbag deployment in which the airbag emerges out of the housing.

With the airbag device of the invention, when the airbag (the folded-up body) housed in the housing is fed with an inflation gas, the airbag will emerge out of the housing, but in an initial stage of airbag deployment, the holding means will hold the auxiliary bag section from protruding out of the front-collision arresting plane of the main bag section. Accordingly, only the main bag section will be be inflated before the auxiliary bag section starts inflation, and the main bag section will be able to substantially complete deployment of the front-collision arresting plane without oscillating in a left and right direction. Thereafter, the auxiliary bag section will be allowed to protrude out of the front-collision arresting plane, which has substantially completed deployment, thus the airbag will reach its fully deployed contour quickly without oscillating in a left and right direction during the course of deployment.

Therefore, the airbag device for a front passenger seat of the invention is able to prevent the airbag from oscillating in a left and right direction during deployment and bring the airbag to full deployment quickly.

In the airbag device of the invention, it is desired that the holding means is a means for temporarily jointing a folded-up auxiliary bag body, which is a folded-up configuration of the auxiliary bag section that is folded up forward such that a circumferential wall of the auxiliary bag section is flush with the front-collision arresting plane, to the main bag section.

With this configuration, since the auxiliary bag section is folded up forward into the folded-up auxiliary bag body such that its circumferential wall is flush with the front-collision arresting plane and is temporarily jointed to the main bag section, after the main bag section has completed deployment of the front-collision arresting plane at airbag deployment, the temporary joint will be undone, such that the folded-up auxiliary bag body will be unfolded and the auxiliary bag section will be deployed rearward in such a manner as to protrude out of the front-collision arresting plane. That is, the auxiliary bag section will be able to protrude steadily rearward out of the front-collision arresting plane having completed deployment, such that the airbag will be able to reach its fully deployed contour quickly without oscillating in a left and right direction.

In the above instance, it is desired that:
the auxiliary bag section includes a rear wall which forms a rear plane of the auxiliary bag section as fully deployed and a circumferential wall disposed around the rear wall;
the folded-up auxiliary bag body is formed by folding up the circumferential wall in front of the rear wall such that the rear wall is flush with the front-collision arresting plane; and
an edge of the rear wall of the auxiliary bag section is temporarily jointed to the main bag section.

With this configuration, when the folded-up auxiliary bag body unfolds and the auxiliary bag section protrudes rearward out of the front-collision arresting plane of the main bag section after the front-collision arresting plane has substantially completed deployment at airbag deployment, the rear wall of the auxiliary bag section having been flush with the front-collision arresting plane will move rearward generally in parallel to the front-collision arresting plane, such that the auxiliary bag section itself will be deployed without oscillating in a left and right direction. As a consequence, the whole airbag will be prevented from oscillating in a left and right direction during deployment. The holding means is desirably composed of a tearable sewing thread that temporarily joints the folded-up auxiliary bag body to the main bag section by sewing.

With this configuration, by being jointed at adequate locations, the folded-up auxiliary bag body composed of the auxiliary bag section will be jointed temporarily to the main bag section in a steady folded-up configuration, and the timing of deployment of the auxiliary bag section out of the front-collision arresting plane will be steady as well.

Furthermore, in the airbag device for a front passenger seat of the invention, the airbag includes an inlet port for introducing an inflation gas into the airbag and a mounting section disposed in a periphery of the inlet port for mounting on the housing, and the folded-up body of the airbag is formed through a folding process composed of:

an initial folding step of superimposing a rear plane of the airbag as fully deployed on a vicinity of the inlet port and the mounting section in a flat fashion to form such an initial folded-up body that the folded-up auxiliary bag body is disposed on the either left or right region of the initial folded-up body;

a left-right contraction step of folding back left and right edges of the initial folded-up body towards the inlet port to form a left-right contracted body which is sized to a width in a left and right direction of the housing; and a front-rear contraction step of folding back front and rear edges of the left-right contracted body towards the inlet port to complete the folded-up body which is sized to a width in a front and rear direction of the housing.

Moreover, in the either left or right region of the initial folded-up body where the folded-up auxiliary bag body is disposed, a circumferential wall of the main bag section on a back side of the initial folded-up body wraps the folded-up auxiliary bag body on a surface of the initial folded-up body.

With this configuration, since the folded-up auxiliary bag body is wrapped and covered by the circumferential wall of the main bag section in the left-right contracted body, at airbag deployment, the auxiliary bag section will be held from deploying rearward and protruding out of the front-collision arresting plane until the airbag unfolds the fold done in the front-rear contraction step and the fold done in the left-right contraction step and the folded-up auxiliary bag body is uncovered. Therefore, this configuration will further help secure the deployment timing of the auxiliary bag section after the front-collision arresting plane has substantially completed deployment in a steady fashion.

In the airbag device for a front passenger seat of the invention, furthermore, the folded-up body of the airbag as housed in the housing has the folded-up auxiliary bag body in the either left or right region, and is wrapped by a wrapping sheet that is tearable at airbag deployment.

The wrapping sheet includes on its region covering an upper plane of the folded-up body a tearable section that includes a plurality of slits extending in a left and right direction in an interspaced fashion. The distance between the slits is smaller in the either left or right region where the folded-up auxiliary bag body is disposed than in the other side where the folded-up auxiliary bag body is not disposed.

This configuration will make the region of the tearable section on the part of the folded-up auxiliary bag body easier to break than the other side and help deploy the region of airbag on the part of the folded-up auxiliary bag body quickly out of the housing in the initial stage of airbag deployment. That is, although the region of the airbag on the part of the folded-up auxiliary bag body has more amount of base cloths, the region will emerge out of the housing quickly, which will help deploy the main bag section in a balanced fashion in a left and right direction, deploy the front-collision arresting plane smoothly, thus deploying the auxiliary bag section at a predetermined timing.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
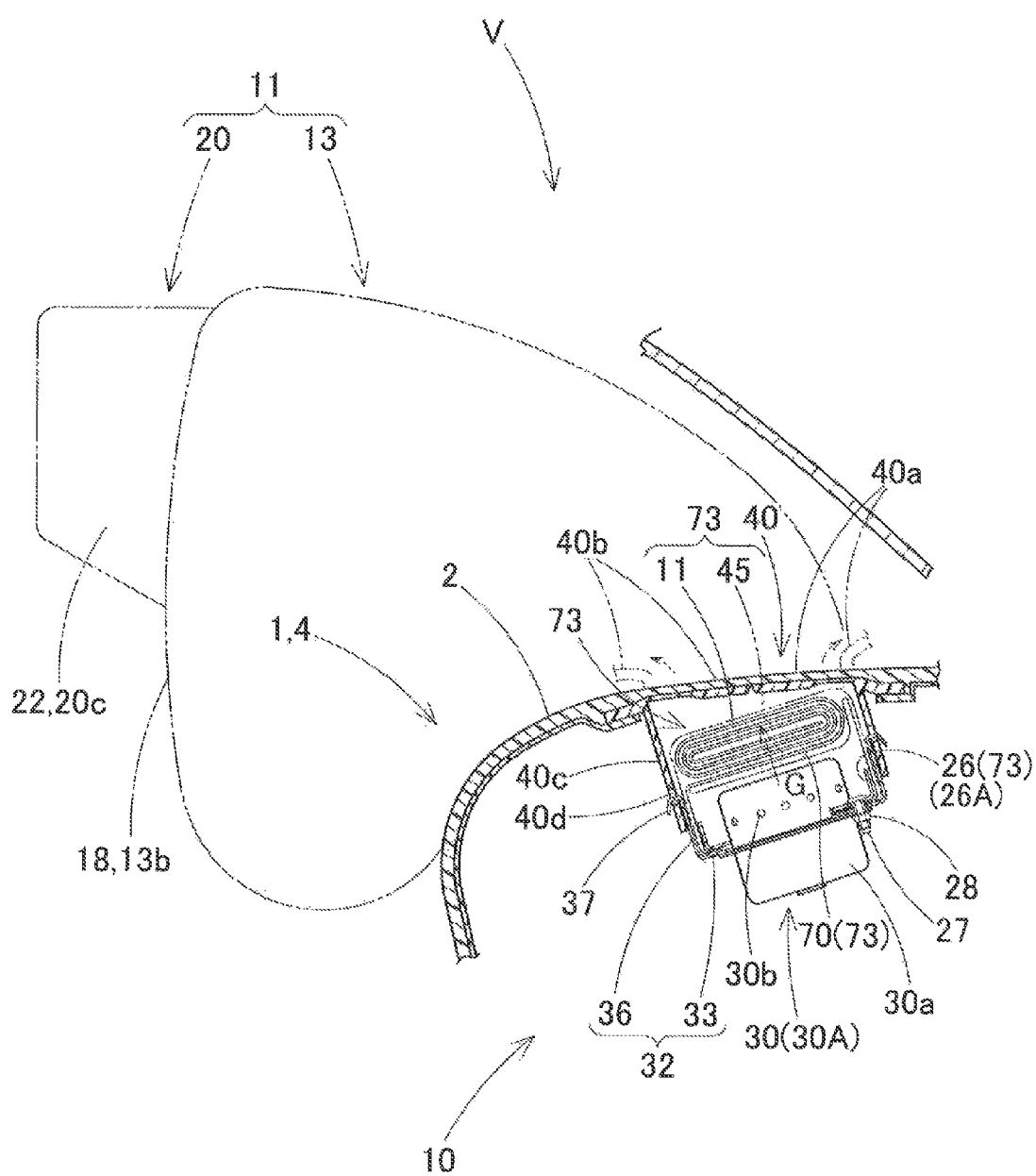
FIG. 1 is a schematic vertical section of an airbag device for a front passenger seat embodying the invention as mounted on a vehicle.
Figure 2:
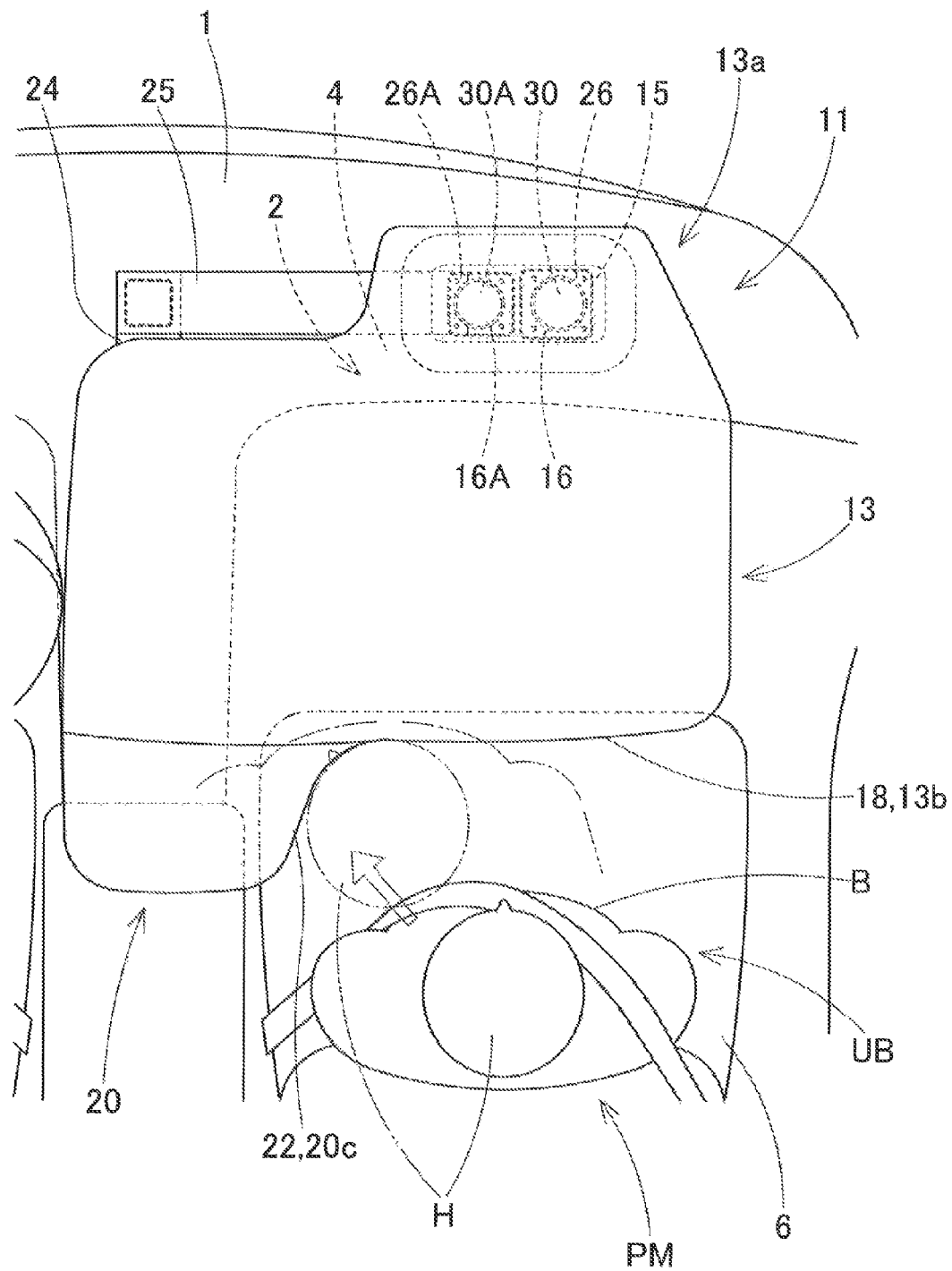
FIG. 2 is a schematic plan view of an airbag of the airbag device of FIG. 1 as fully deployed.
Figure 10:
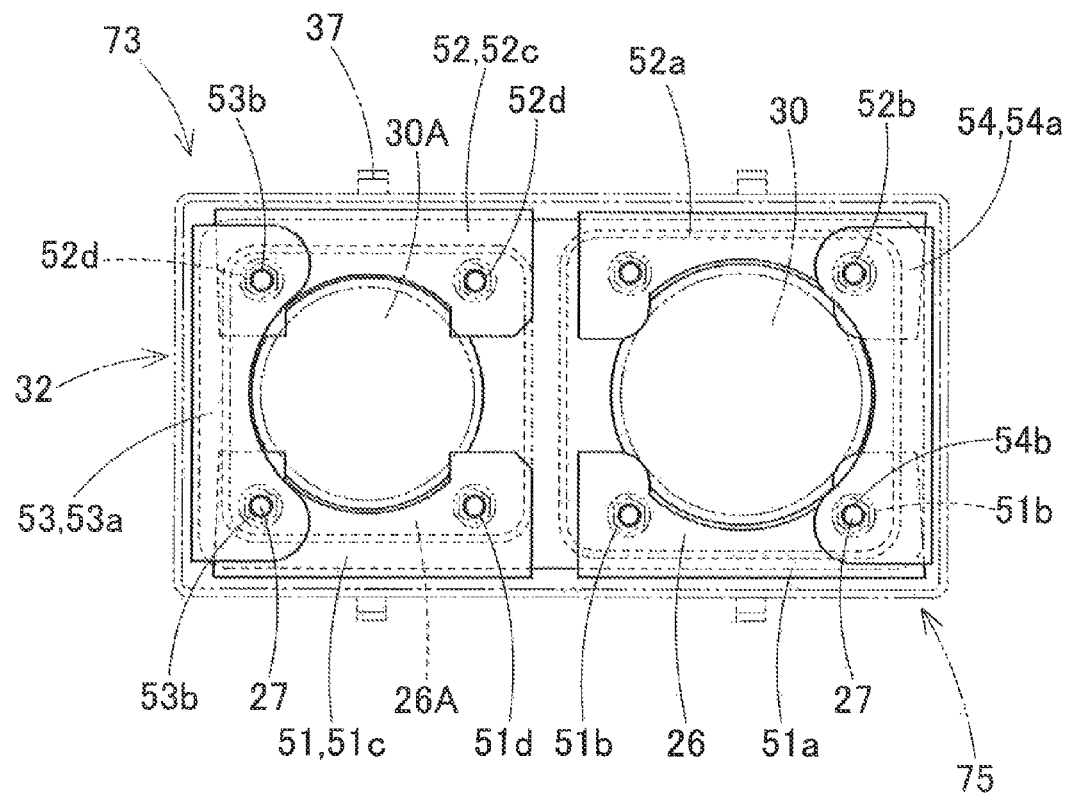
FIG. 10 is a bottom view of the folded-up body as wrapped by the wrapping sheet.

FIGS. 1 and 2 depict an airbag device 10 for a front passenger seat embodying the invention. The airbag device 10 is mountable on a region of an instrument panel or dashboard 1 disposed in front of a front passenger seat 6 of a vehicle V. Specifically, the airbag device 10 is mounted on a passenger seat side region 4 of the dashboard 1. As shown in FIGS. 1, 2 and 10, the airbag device 10 includes an airbag module 73 having an airbag 11, two inflators 30 and 30A for supplying the airbag 11 with an inflation gas G, a case or housing 32 for housing and holding the airbag module 73 and inflators 30 and 30A, and an airbag cover 40 for covering an upper side of the case 32. The airbag module 73 includes a folded-up body 70 (see FIGS. 7A to 8), which refers to a folded-up form of the airbag 11, retainers 26 and 26A and a wrapping sheet 45 wrapping the folded-up body 70.

Unless otherwise specified, front/rear, up/down and left/right directions in this specification are intended to refer to front/rear, up/down and left/right directions of the vehicle V.

As shown in FIG. 1, the airbag cover 40 is mounted on the passenger seat side region 4 of the dashboard 1 and includes two doors 40a and 40b adapted to open forward and rearward when pushed by the airbag 11 upon airbag deployment. The airbag cover 40 further includes around the doors 40a and 40b a side wall 40c which extends downward in a square tubular shape. The side wall 40c is provided with a plurality of retaining holes 40d for joint with the case 32.

Figure 3:
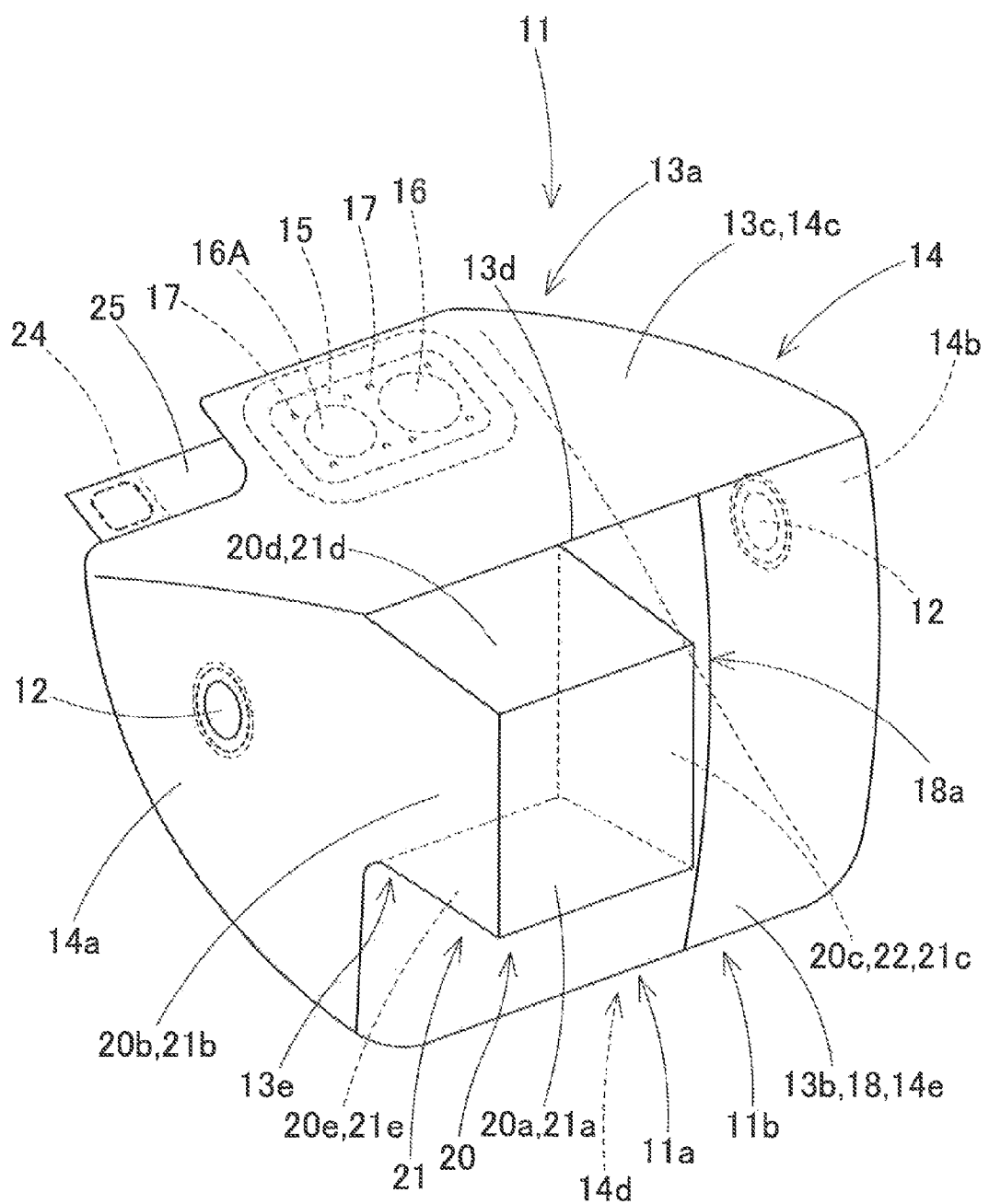
FIG. 3 is a schematic perspective view of the airbag of FIG. 2 as fully inflated.

As shown in FIGS. 1, 10 to 12, the case 32 serves as a housing of the airbag module 73. The case 32 is made of sheet metal into a generally rectangular parallelepiped opening upward and elongated in a left and right direction. The case 32 includes a generally rectangular bottom wall 33 and a circumferential wall 36 extending upward from the outer edge of the bottom wall 33. The bottom wall 33 is provided with two round openings 34 and 34A for receiving generally columnar main bodies 30a of the inflators 30 and 30A from below. The openings 34 and 34A are disposed side by side in a left and right direction. In a periphery of each of the openings 34 and 34A are mounting holes 33a for receiving bolts 27 of the retainers 26 and 26A. The circumferential wall 36 includes at the top hooks 37 to be inserted into the retaining holes 40d of the side wall 40c of the airbag cover 40 for retaining the side wall 40c (FIGS. 1 and 3).

The case 32 further includes either on the circumferential wall 36 or on the bottom wall 33 not-shown mounting members adapted to be secured to brackets extending from a dashboard reinforcement. The mounting members mount and secure the airbag device 10 to the vehicle body structure of the vehicle V.

Each of the inflators 30 and 30A includes a columnar main body 30a and a square annular flange 30c disposed on the outer circumference of the main body 30a. Each of the main bodies 30a is provided at the upper region with gas discharge ports 30b for emitting inflation gas G. Each of the flanges 30c includes through holes 30d for receiving the bolts 27 of the retainer 26 or 26A.

The retainers 26 and 26A attach the airbag module 73 and inflators 30 and 30A to the case 32. Each of the retainers 26 and 26A is square annular in shape such that the main body 30a of the inflator 30/30A goes therethrough, and is provided, at its four corners, with bolts 27 protruding downward. Each of the retainers 26 and 26A is placed on the periphery of later-described inlet port 16/16A of the airbag 11 inside the airbag 11 such that the bolts 27 protrude out of the mounting holes 17 of the airbag module 73, and the bolts 27, as the retainers 26 and 26A are housed inside the airbag 11, are put through the mounting holes 33a in the peripheries of the openings 34 and 34A of the bottom wall 33 of the case 32 and through holes 30d of the flanges 30c of the inflators 30 and 30A for nut 28 fastening. Thus the airbag module 73 and inflators 30 and 30A are secured to the bottom wall 33 of the case 32.

The bolts 27 of the retainers 26 and 26A are also inserted through later-described retaining holes 51b, 51d, 52b, 52d, 53b and 54b of the wrapping sheet 45 to help the wrapping sheet 45 to wrap the folded-up body 70.

As shown in FIGS. 1 to 3, the airbag 11 constituting the folded-up body 70 includes a man bag section 13 and an auxiliary bag section 20. The rear plane 13b of the main bag section 13 is designed to be deployed generally vertically and the auxiliary bag section 20 is deployable in such a manner as to protrude rearward from an upper region of a left edge region of the rear plane 13b of the main bag section 13.

The main bag section 13 is inflatable into a generally triangular pole extending in a left and right direction and narrowing forward in dimension in an up and down direction. That is, the circumferential wall 14 of the main bag section 13 includes side walls 14a and 14b disposed on the left and right in a triangular plate shape, an upper wall 14c and a lower wall 14d connecting upper and lower edges of the side walls 14a and 14b and opposed to each other in an up and down direction, and a rear wall 14e disposed in such a manner as to connect rear edges of the walls 14a, 14b, 14c and 14d. The rear plane 13b of the rear wall 14e of the main bag section 13, which is deployable generally vertically, serves as a front-collision arresting plane 18 that catches the upper body UB including the head H and thorax B of a passenger PM seated in the front passenger seat 6 in the event of a frontal collision of the vehicle V at which the passenger PM moves forward. The lower surface of the front end region 13a of the main bag section 13 (i.e., the front end region of the lower wall 14d) serves as a mounting section 15 to be attached to the bottom wall 33 of the case 32. The mounting section 15 is provided with two round inlet ports 16 and 16A for receiving the inflators 30 and 30A from below. Peripheries of the inlet ports 16 and 16A are pressed down against the bottom wall 33 of the case 32 by the retainers 26 and 26A. Around the inlet ports 16 and 16A are mounting holes 17 for receiving the bolts 27 of the retainers 26 and 26A.

The auxiliary bag section 20 is inflatable into a generally rectangular parallelepiped and is so formed as to protrude rearward from the upper region of the left edge region of the rear wall 14e (i.e., of the region facing towards the driver's seat) of the main bag section 13. The right side plane 20c of the auxiliary bag section 20 facing towards the front-collision arresting plane 18 serves as an oblique-collision arresting plane 22 for catching the head H of the passenger PM moving diagonally forward toward the driver's seat in the event of an oblique collision (including an offset collision as well as an oblique collision) of the vehicle V.

The circumferential wall 21 of the auxiliary bag section 20 is composed of a rear wall 21a forming a rear plane 20a, a left side wall 21b forming a left side plane 20b, a right side wall 21c forming the right side plane 20c (i.e., the oblique-collision arresting plane 18), an upper wall 21d forming an upper plane 20d and a lower wall 21e forming a lower plane 20e. When the airbag 11 of the illustrated embodiment is fully inflated, the left side wall 14a of the main bag section 13 is continuous with the left side wall 21b of the auxiliary bag section 20 and the upper wall 14c of the main bag section 13 is continuous with the upper wall 21d of the auxiliary bag section 20. The right side wall 21c and lower wall 21e of the auxiliary bag section 20 rise toward the rear from the rear wall 14e of the main bag section 13.

The main bag section 13 includes on each of the left side wall 14a and right side wall 14b a vent hole 12 for emitting an extra inflation gas G. Further, tethers 24 and 25 are disposed on the left side of the mounting section 15 of the main bag section 13 in a L shape to join the left edge region of the lower wall 14d to a vicinity of the mounting section 15.

Figure 4:
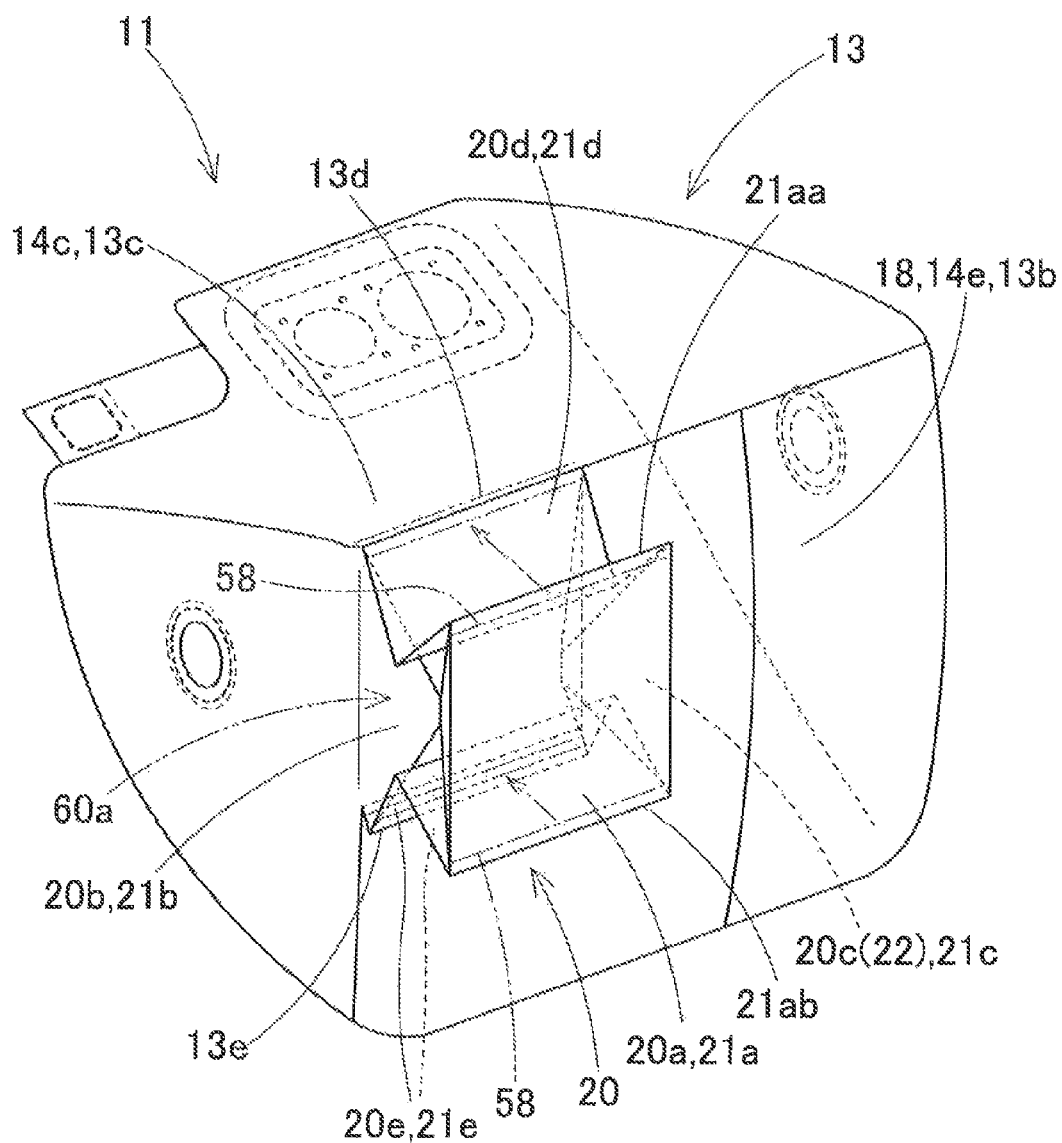
FIG. 4 depicts the way an auxiliary bag section is temporarily jointed to a main bag section.
Figure 5:
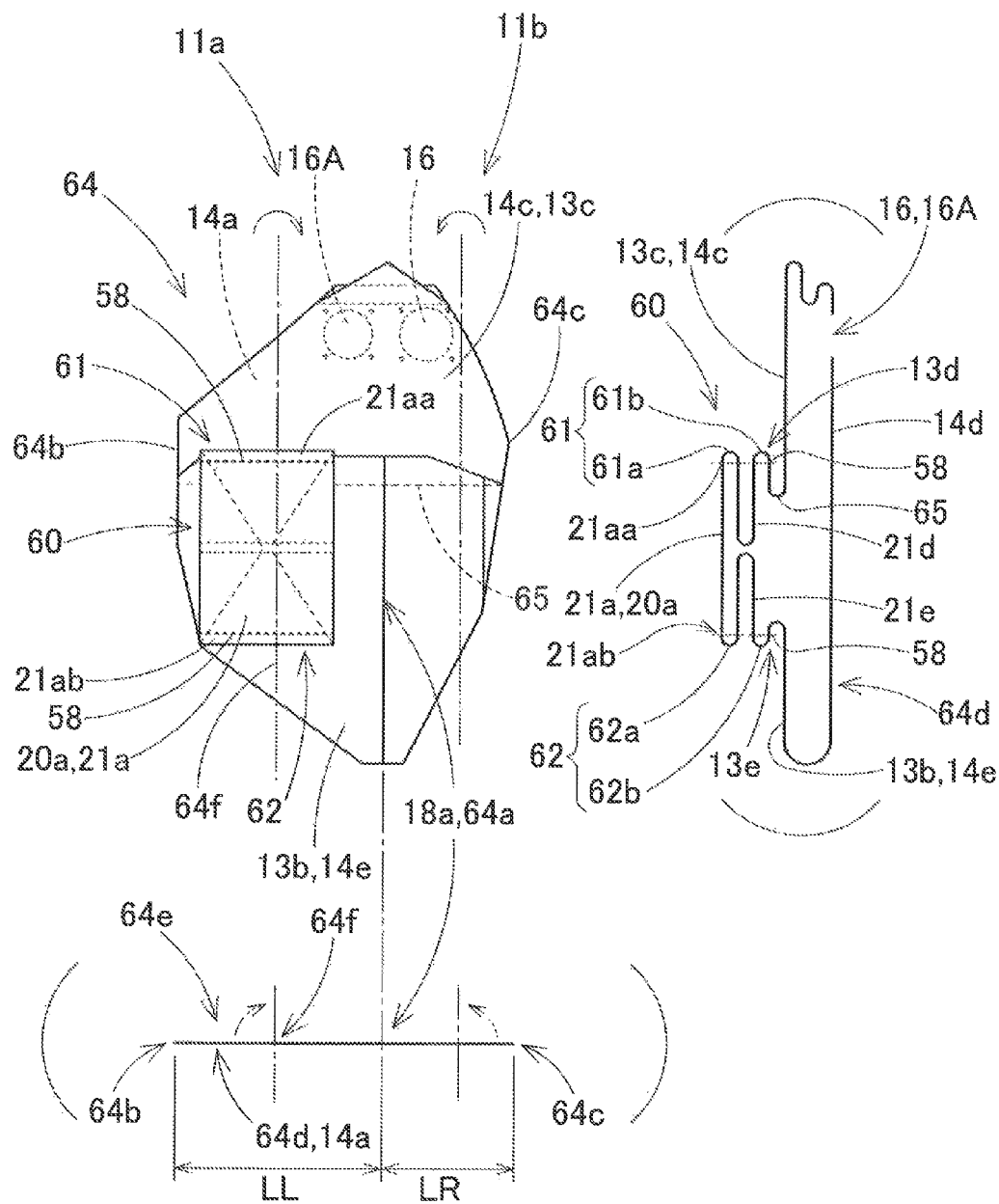
FIG. 5 depicts an initial folding step of the folding process of the airbag of FIG. 2 for forming an initial folded-up body.

Referring to FIGS. 4 and 5, when the airbag 11 is folded up, the auxiliary bag section 20 is temporarily jointed or sewn to the main bag section 13 with sewing threads 58 which serve as a holding means for preventing the auxiliary bag section 20 from protruding rearward from the front-collision arresting plane 18 in an initial stage of airbag deployment.

The airbag 11 is folded up in a state where the retainers 26 and 26A are put inside the airbag 11 such that the bolts 27 protrude out of the mounting holes 17, The manner of the temporary joint is now described. In the illustrated embodiment, having the rear plane 20a (rear wall 21a) of the auxiliary bag section 20 flattened, the auxiliary bag section 20 is folded up forward by folding up the left side wall 21b, right side wall 21c, upper wall 21d and lower wall 21e, which adjoin the rear wall 21a, in front of the rear wall 21a, thus forming a folded-up auxiliary bag body 60. Then the folded-up auxiliary bag body 60 is temporarily jointed to the main bag section 13 by forming seams 61 and 62 with sewing threads 58 at the upper edge 21 as and lower edge 21ab of the rear wall 21a of the auxiliary bag section 20.

As shown in FIG. 5, the seam 61 sews a rear upper tucked region 61a, which is formed by pinching together the rear wall 21a and upper wall 21d in a vicinity of the upper edge 21aa, to a front upper tucked region 61b, which is formed by pinching together the upper wall 21d and the upper wall 14c of the main bag section 13 in a vicinity of the upper wall 21d, at the upper edge 21aa. The seam 62 sews a rear lower tucked region 62a, which is formed by pinching together the rear wall 21a and lower wall 21e in a vicinity of the lower edge 21ab, to a front lower tucked region 62b, which is formed by pinching together the lower wall 21e and the rear wall 14e of the main bag section 13 in a vicinity of the lower wail 21e, at the lower edge 21ab. In other words, the seam 61 sews the upper edge 21aa of the rear plane 20a of the auxiliary bag section 20 to a vicinity of the rear edge 13d of the upper plane 13c of the main bag section 13 while the seam 62 sews the lower edge 21ab of the rear plane 20a of the auxiliary bag section 20 to a region 13e of the rear plane 13b of the main bag section 13 immediately below the auxiliary bag section 20.

The sewing thread 58 is formed of polyester, polyamide or the like and has such a strength that is tearable when an in-folded region 60a, which is folded up in front of the rear wall 21a, of the folded-up auxiliary bag body 60 is pushed rearward by an inflation gas G after the front-collision arresting plane 18 is unfolded at airbag deployment.

After the folded-up auxiliary bag body 60 (i.e., the folded-up form of the auxiliary bag section 20) is sewn to the main bag section 13, the airbag 11 is folded up into the folded-up body 70 through an initial folding step, a left-right contraction step and a front-rear contraction step. In the initial folding step, an initial folded-up body 64 is formed as shown in FIG. 5. The initial folded-up body 64 has such a configuration that the rear plane 13b at full deployment is superimposed in a flat fashion on the region in a vicinity of the inlet ports 16 and 16A and mounting section 15 disposed therearound, i.e., on the lower wall 14d of the main bag section 13. The upper wall 14c (upper plane 13c) of the main bag section 13 is folded inward on a valley crease 65 extending in a left and right direction in a vicinity of the rear edge 13d of the upper wall 14c. Thus, in the initial folded-up body 64, the upper wall 14c is disposed between the rear plane 13b (rear wall 14e) and lower wall 14d.

When the rear wall 14e is laid over the lower wall 14d, it is desired that the rear wall 14e is disposed to the rear and away from the mounting section 15 (i.e., from the inlet ports 16 and 16A) because the main bag section 13 is desirably rolled on the lower wall 14d (FIG. 7B) in the final phase of airbag folding for smooth unfolding along the top plane 2 of the dashboard 1 at airbag deployment.

On the rear wall 14e, the center 18a in a left and right direction of the front-collision arresting plane 18 is disposed at the rear of the inlet ports 16 and 16A, as shown in FIG. 5. Since the auxiliary bag section 20 having a certain volume is disposed on the region of the rear wall 14e facing toward the driver's seat, the left region 11a of the airbag 11 relative to the center 18a has a greater volume than the right region 11b relative to the center 18a. Therefore, a length LL from the center 64a (18a) to the left edge 64b of the initial folded-up body 64 is longer than a length LR from the center 64a (18a) to the right edge 64c.

Figure 6A:
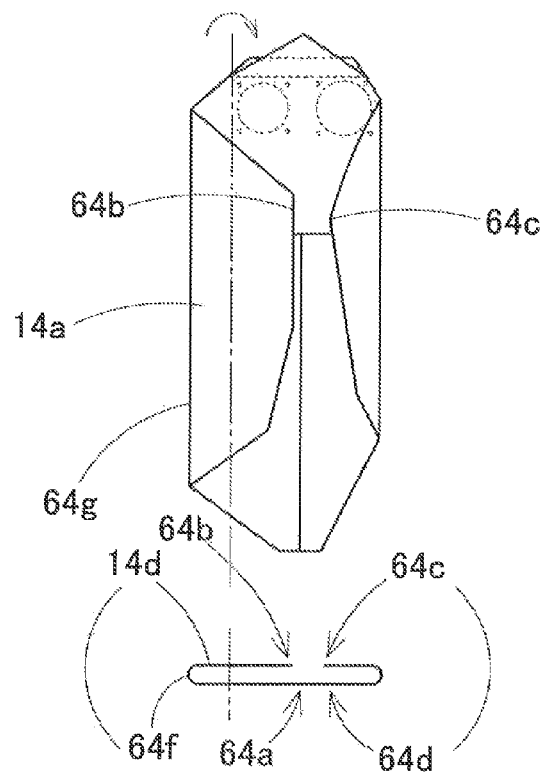
FIGS. 6A and 6B depict a left-right contraction step following the initial folding step for forming a left-right contracted body.

The left-right contraction step follows the initial folding step, as shown in FIG. 6. The left-right contraction step forms a left-right contracted body 67 which is sized to a width CW (FIG. 12) in a left and right direction of the case or housing 32. In the left-right contraction step, left and right edges 64b and 64c of the initial folded-up body 64 are folded back towards the center 64a, i.e., towards the inlet ports 16 and 16A, thus forming the left-right contracted body 67. In the illustrated embodiment, in the left edge region 64b of the initial folded-up body 64, where the folded-up auxiliary bag body 60 is located, a circumferential wall on the back side 64d of the initial folded-up body 64, i.e., the left side wall 14a, wraps and covers the folded-up auxiliary bag body 60 on the surface 64e of the initial folded-up body 64. More specifically, in the illustrated embodiment, the left edge region 64b is folded back twice by an irregular rolling. That is, as shown in FIGS. 5 and 6A, the left edge region 64b is firstly folded back towards the center 64a on a crease 64f extending in a front and rear direction and then folded back once more towards the center 64a as shown in FIG. 63.

The right edge region 64a is folded back once towards the center 64a on the surface 64e of the initial folded-up body 64. Thus the left-right contracted body 67 is formed.

Figure 7A:
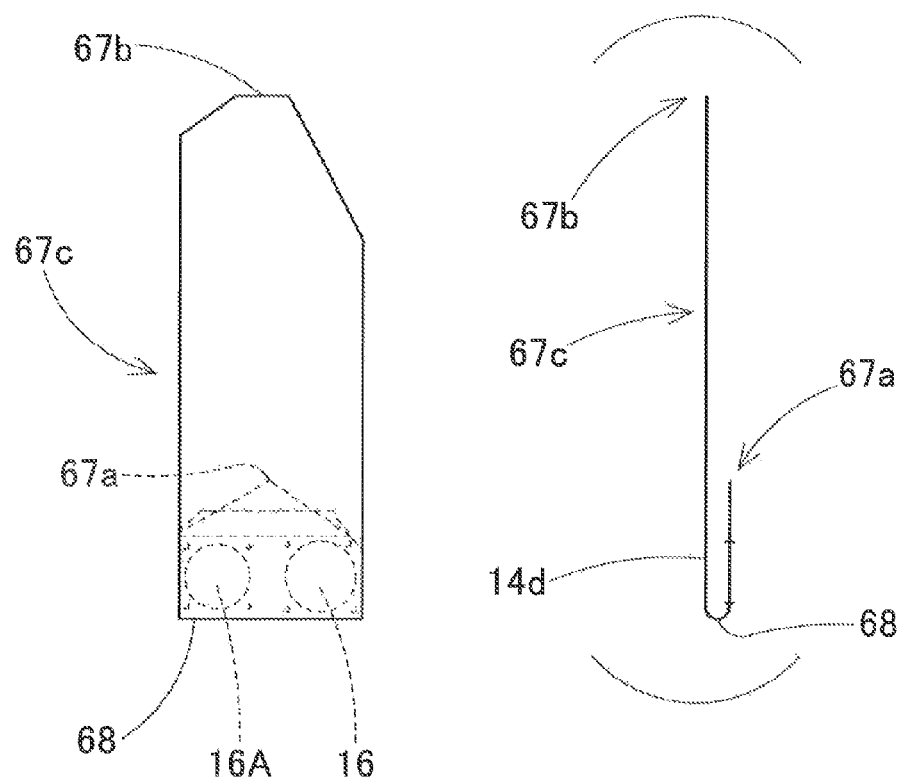
FIGS. 7A, 7B and 7C depict a front-rear contraction step following the left-right contraction step for forming a folded-up body.
Figure 7B:
Figure 7C:
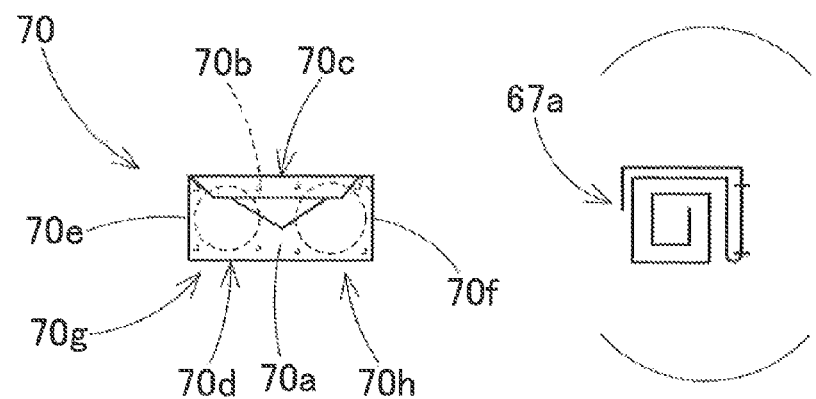

The front-rear contraction step follows the left-right contraction step as shown in FIGS. 7A to 7C. The front-rear contraction step forms the folded-up body 70 which is sized to a width CL (FIG. 12) in a front and rear direction of the case 32. In the front-rear contraction step, the left-right contracted body 67 is so folded that its front and rear edges 67a and 67b are brought close to the inlet ports 16 and 16A. In the illustrated embodiment, specifically, a rear region 67c, which is disposed at the rear of the inlet ports 16 and 16A in the left-right contracted body 67, is rolled on the lower wall 14d from the rear edge 67b such that the rolled region is disposed on the inlet ports 16 and 16A, and then the front edge region 67a is placed on the top plane of the folded-up body 70.

Figure 6B:
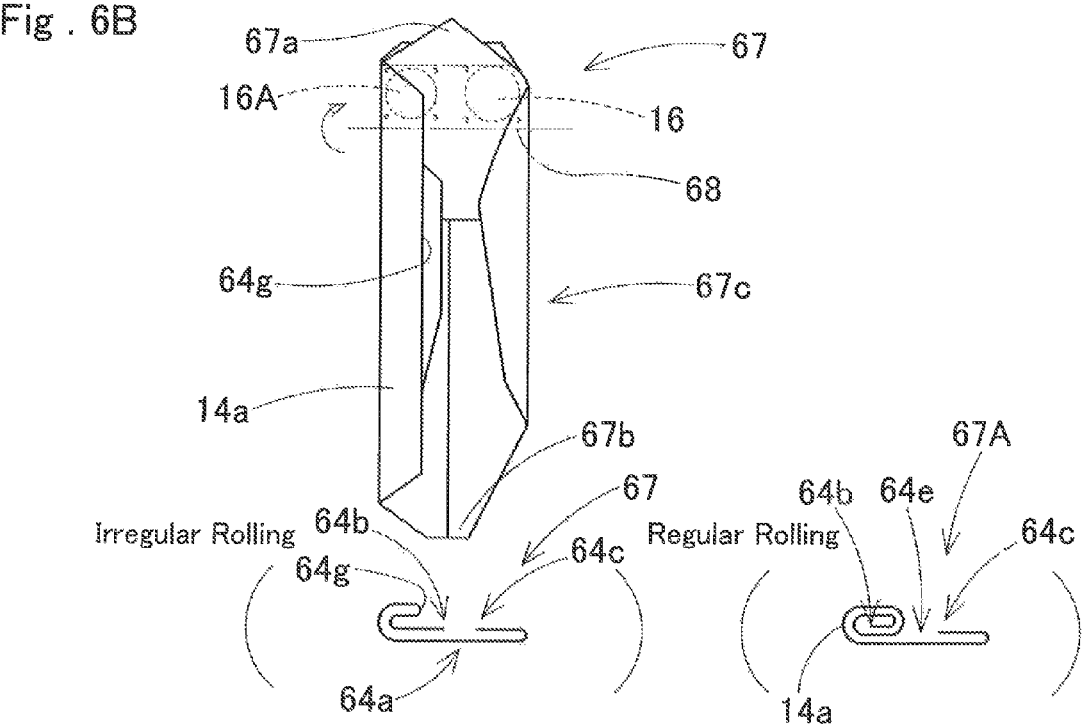

In the illustrated embodiment, more particularly, as shown in FIGS. 6B and 7A, the rear region 67c is firstly folded forward on a crease 68 in a vicinity of the rear edge of the inlet ports 16 and 16A so as to facilitate rolling on the lower wall 14d. Then the rear region 67c is rolled on the lower wall 14d from the rear edge 67b as shown in FIG. 7B, and then the front edge region 67a is placed on the top plane of the folded-up body 70 as shown in FIG. 7C. Thus the folded-up body 70 is formed.

Figure 12:
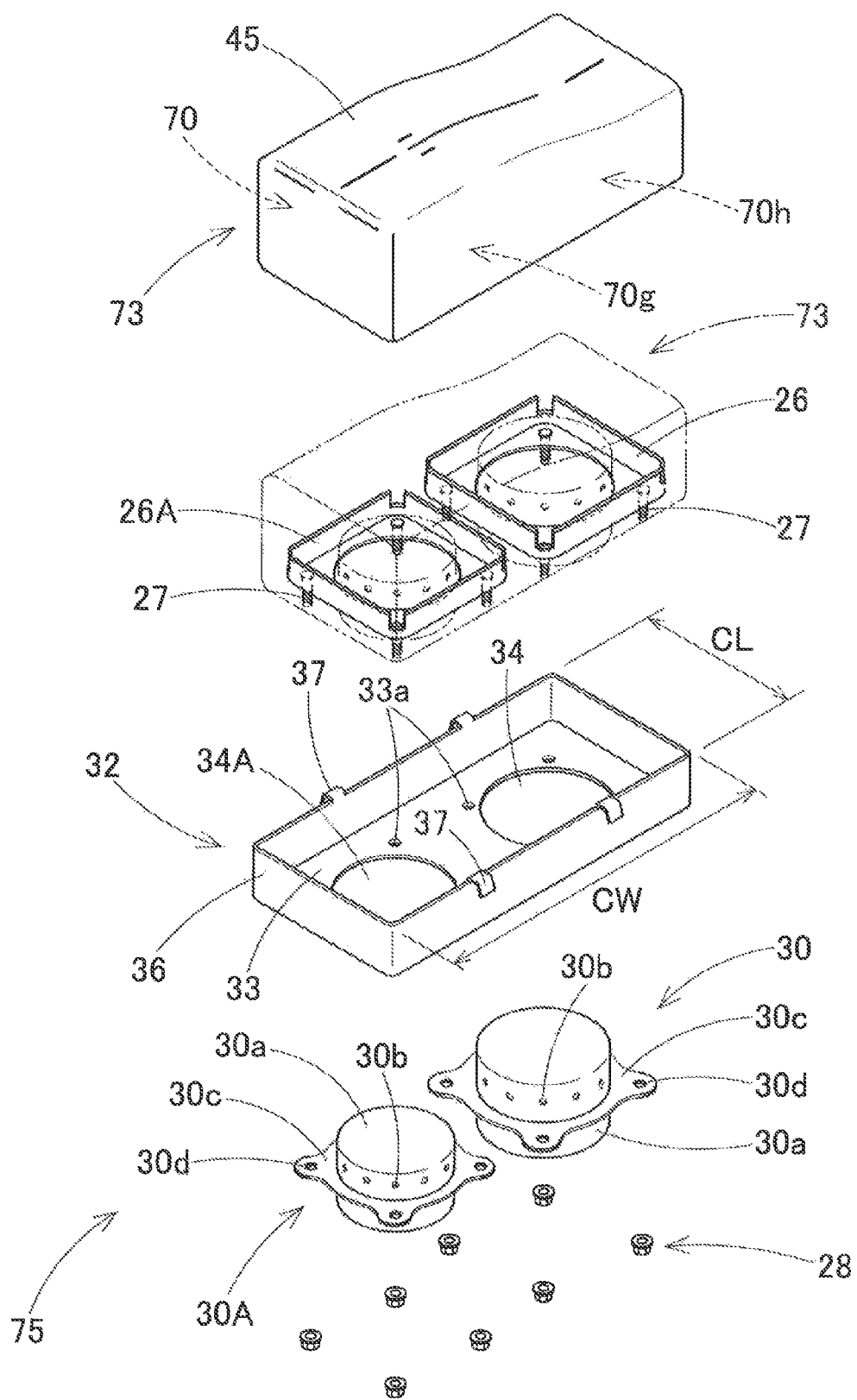
FIG. 12 is a schematic exploded perspective view of the device body.

The folded-up body 70 is a generally rectangular parallelepiped having the bolts 27 of the retainers 26 and 26A protruded out of the bottom plane 70b, and its left region 70g in which the auxiliary bag section 20 is folded up is greater in thickness in an up and down direction than the right region 70h as shown in FIG. 12.

Figure 8:
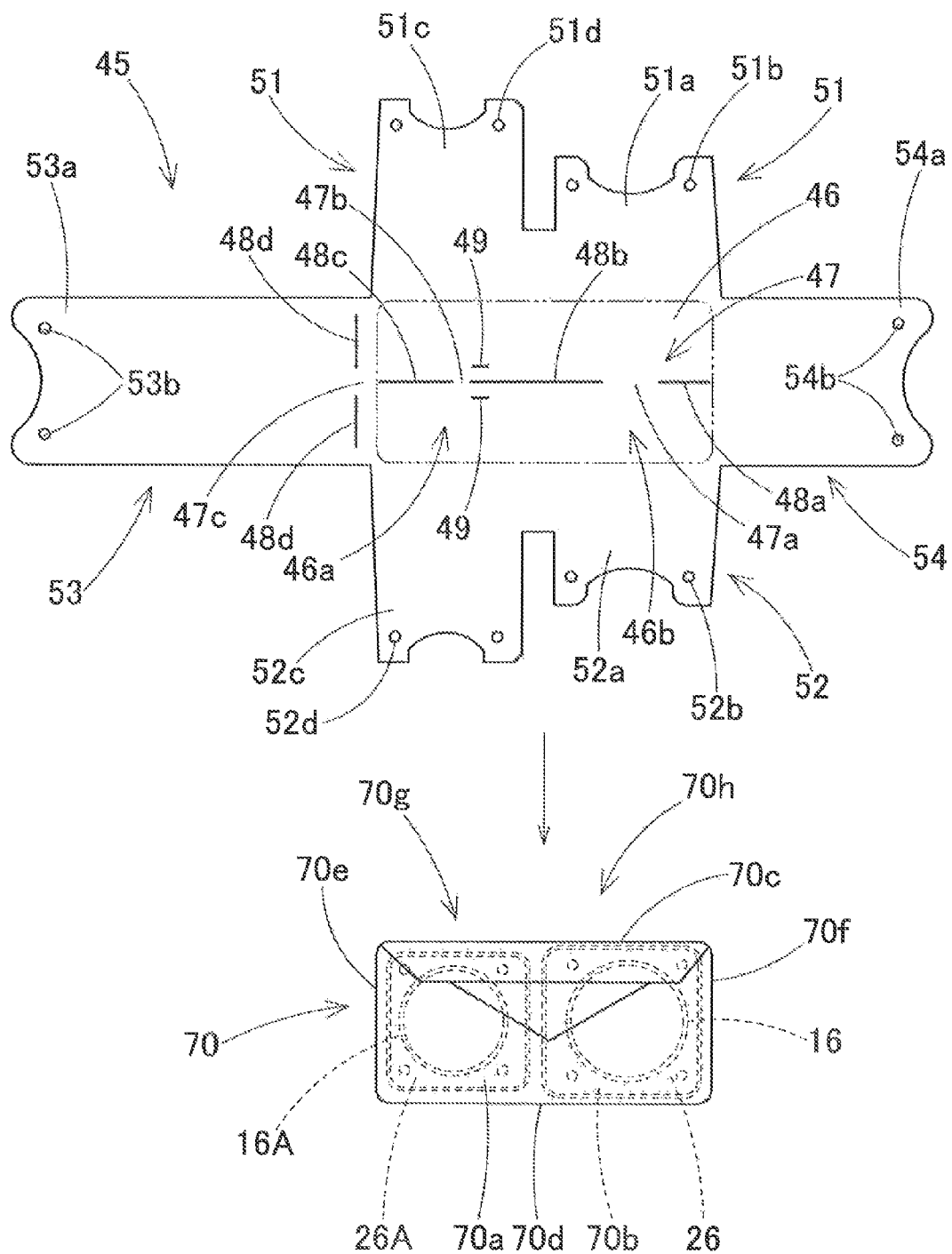
FIG. 8 is a plan view of a wrapping sheet for wrapping the folded-up body.
Figure 9:
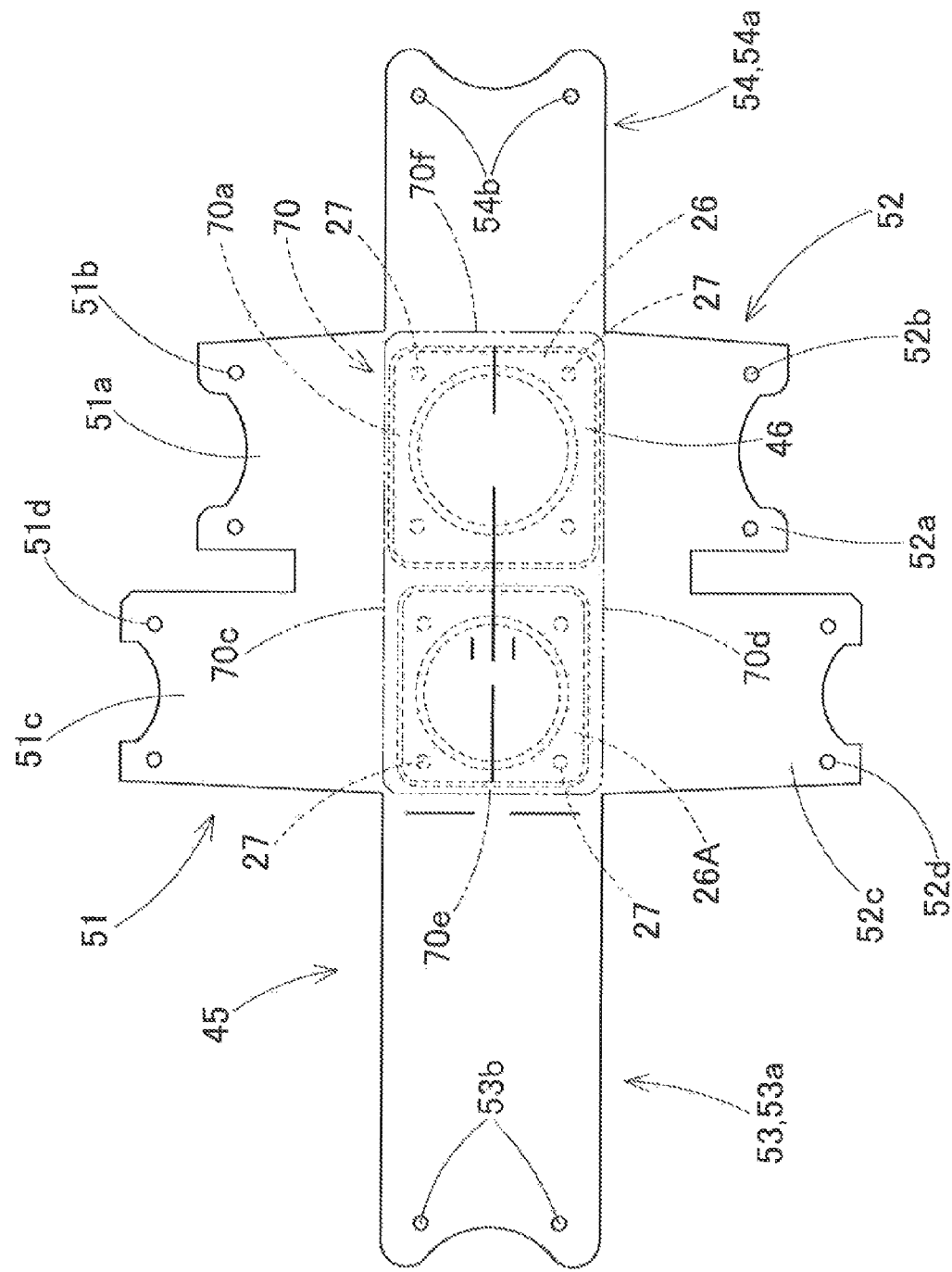
FIG. 9 is a plan view of the wrapping sheet illustrating the arrangement relationship against the folded-up body.

The folded-up body 70 is then wrapped by a wrapping sheet 45 for keeping the folded-up configuration, thereby forming an airbag module 73. The wrapping sheet 45 is formed of a plain weave, twill weave, satin weave fabric or the like woven with polyimide yarn, polyester yarn or the like. FIGS. 8 and 9 depict the wrapping sheet 45 as is unfolded in a flat fashion. The wrapping sheet 45 includes a rectangular ceiling region 46 corresponding in shape to the ceiling plane 70a of the folded-up body 70 and a front region 51, a rear region 52, a left region 53 and a right region 54 extending towards the front, rear, left and right from the ceiling region 46.

The front region 51 covers the front plane 70c and bottom plane 70b of the folded-up body 70. The front region 51 includes a mounting flap 51a which includes at the leading end retaining holes 51b for receiving the bolts 27 of the front region of the retainer 26 and a mounting flap 51c which includes at the leading end retaining holes 51d for receiving the bolts 27 of the front region of the retainer 26A. The mounting flap 51c is longer in length than the mounting flap 51a by the difference in thickness between the left region 70g and right region 70h of the folded-up body 70. Each of the mounting flaps 51a and 51c is provided with a recessed region (reference numeral omitted) at the leading end so as not to close off the inlet ports 16/16A.

The rear region 52 covers the rear plane 70d and bottom plane 70b of the folded-up body 70. The rear region 52 includes a mounting flap 52a which includes at the leading end retaining holes 52b for receiving the bolts 27 of the rear region of the retainer 26 and a mounting flap 52c which includes at the leading end retaining holes 52d for receiving the bolts 27 of the rear region of the retainer 26k. The mounting flap 52c is longer in length than the mounting flap 52a by the difference in thickness between the left region 70g and right region 70h of the folded-up body 70. Each of the mounting flaps 52a and 52c is provided with a recessed region (reference numeral omitted) at the leading end so as not to close off the inlet ports 16/16A.

The left region 53 covers the left side plane 70e and bottom plane 70b of the folded-up body 70 and includes a mounting flap 53a which includes at the leading end retaining holes 53b for receiving the bolts 27 of the left region of the retainer 26A. The right region 54 covers the right side plane 70f and bottom plane 70b of the folded-up body 70 and includes a mounting flap 54a which includes at the leading end retaining holes 54b for receiving the bolts 27 of the right region of the retainer 26. Each of the mounting flaps 53a and 54a is provided with a recessed region (reference numeral omitted) at the leading end so as not to close off the inlet ports 16/16A. The mounting flap 53a is longer in length than the mounting flap 54a by the difference in thickness between the left region 70g and right region 70h of the folded-up body 70.

The ceiling region 46 includes a tearable section 47 which is tearable when pushed by an inflating airbag 11. The tearable section 47 is designed to rupture faster at a left region 46a of the ceiling region 46 than at a right region 46b. The tearable section 47 is composed of three slits 48a, 48b and 48c which extend along a left and right direction in tandem in a interspaced fashion at the center in a front and rear direction of the ceiling region 46, a tearable region 47a formed between the slits 48a and 48b and a tearable region 47b formed between the slits 48b and 48c. The tearable region 47b formed between the slits 48b and 48c is shorter in length than the tearable region 47a formed between the slits 48a and 48b, thus the left region 46a of the ceiling region 46 ruptures faster than the right region 46b.

In the illustrated embodiment, furthermore, auxiliary slits 49 are disposed on both sides of the slit 48b in a vicinity of the tearable region 47b and vertical slits 48d are disposed on both sides of the slit 48c in the left region 53 proximate the slit 48c in such a manner as to extend in a front and rear direction. The auxiliary slits 49 and vertical slits 48d further help rupture the left region 46a of the ceiling region 46 faster than the right region 46b.

As shown in FIG. 9, the wrapping sheet 45 wraps the folded-up body 70 such that the ceiling region 46 is disposed on the ceiling plane 70a. The front region 51 of the wrapping sheet 45 is applied to the front plane 70c of the folded-up body 70 and corresponding bolts 27 of the retainers 26 and 26A are put through the retaining holes 51b and 51d of the mounting flaps 51a and 51c. The rear region 52 of the wrapping sheet 45 is applied to the rear plane 70d of the folded-up body 70 and corresponding bolts 27 of the retainers 26 and 26A are put through the retaining holes 52b and 52d of the mounting flaps 52a and 52c. Further, the left region 53 and right region 54 are applied to the left side plane 70e and right side plane 70f and corresponding bolts 27 of the retainers 26 and 26A are put through the retaining holes 53b and 54b of the mounting flaps 53a and 54a. Thus the folded-up body 70 is wrapped by the wrapping sheet 45 and the airbag module 73 is completed (FIG. 10).

Figure 11:
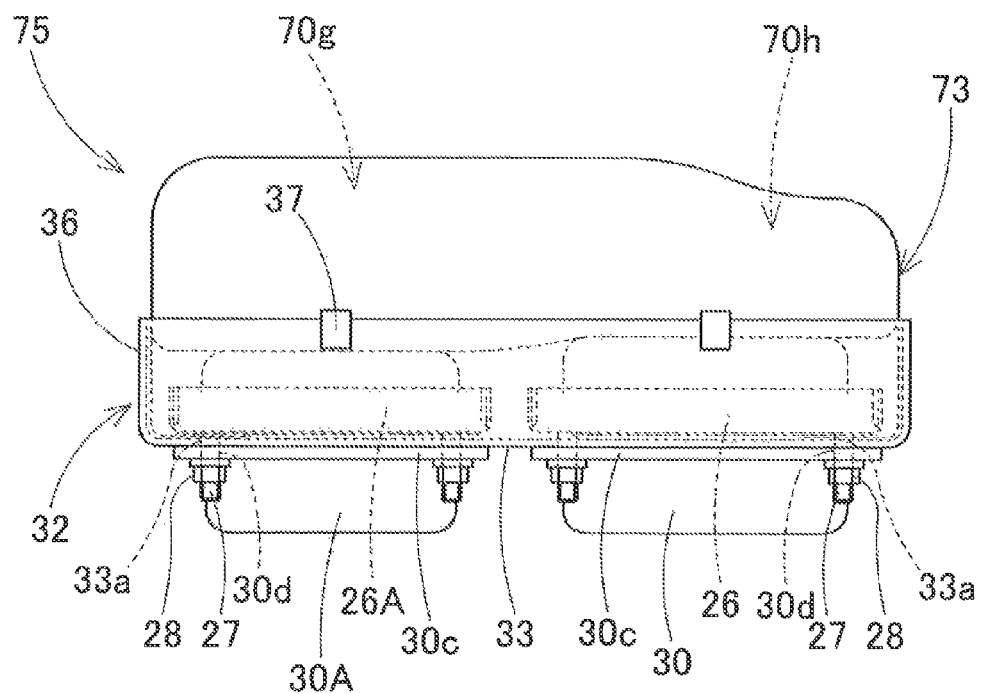
FIG. 11 is a front elevation of a device body of the airbag device with no airbag cover.

Thereafter, the airbag module 73 is placed on the bottom wall 33 of the case 32 such that the bolts 27 of the retainers 26 and 26A protrude out of the mounting holes 33a, Then the main bodies 30a of the inflators 30 and 30A are set in the openings 34 and 34A and inlet ports 16 and 16A from below such that the bolts 27 penetrate the flanges 30c of the inflators 30 and 30A. If then nuts 28 are used to fasten the bolts 27, an airbag device body 75 is formed as shown in FIG. 11.

Thereafter, the case 32 is jointed to the brackets extending from the dashboard reinforcement of the vehicle V with the aid of the not-shown mounting members, and the inflators 30 and 30A are connected to lead wires extending from a not-shown control device for actuating the airbag device 10. Then if the dashboard 1 is mounted on the vehicle V by having the hooks 37 of the case 32 engaged with the retaining holes 40d of the side wall 40c of the airbag cover 40, the airbag device 10 is mounted on the vehicle V.

After the airbag device 10 for a front passenger seat is mounted on the vehicle V, if the inflators 30 and 30A are fed with an actuating signal, the inflators 30 and 30A will feed the airbag 11 with an inflation gas G, and the airbag 11 (i.e., the folded-up body 70) fed with the inflation gas will push and open the doors 40a and 40b of the airbag cover 40, protrude out of the case 32, and be deployed rearward as shown in FIGS. 13 and 14.

Figure 13A:
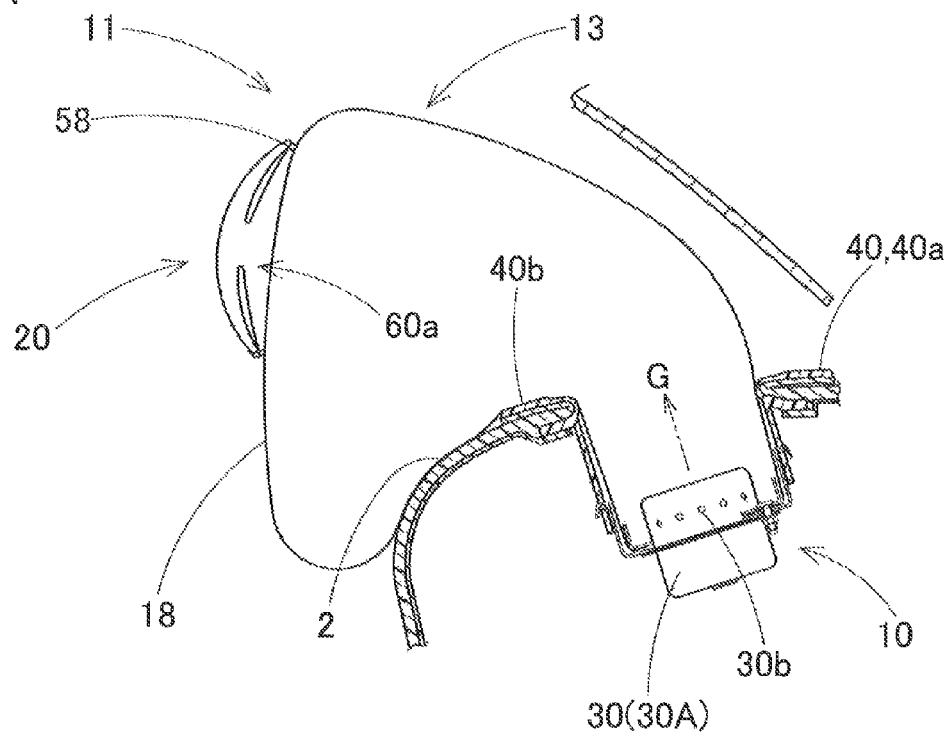
FIGS. 13A and 13B are schematic vertical sections of the airbag device of FIG. 1 illustrating the behavior at airbag deployment.
Figure 13B:
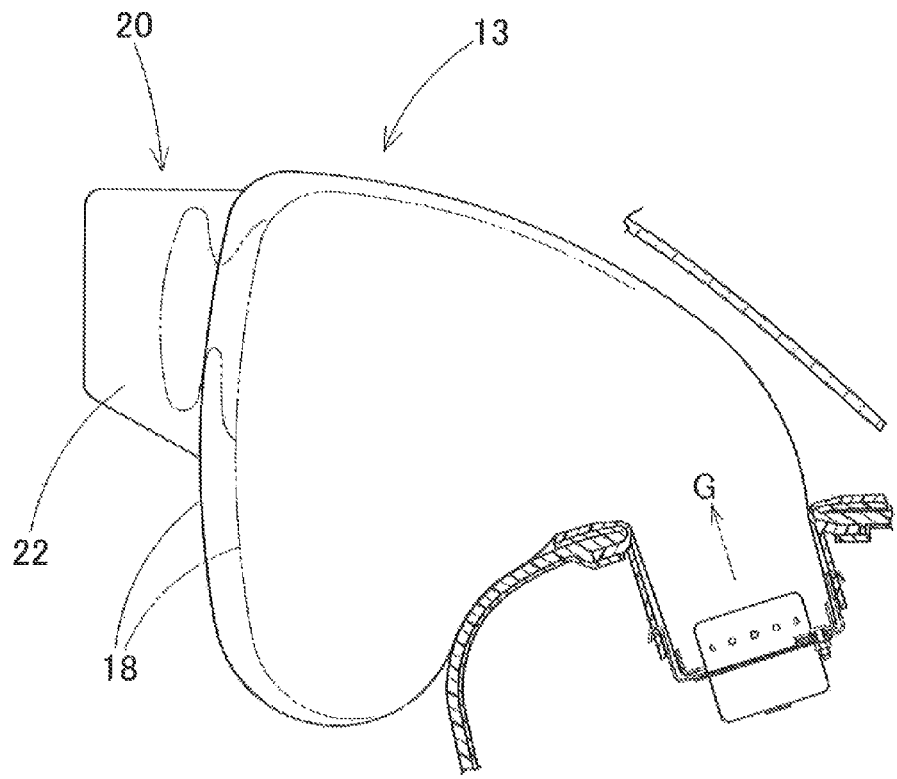
Figure 14A:
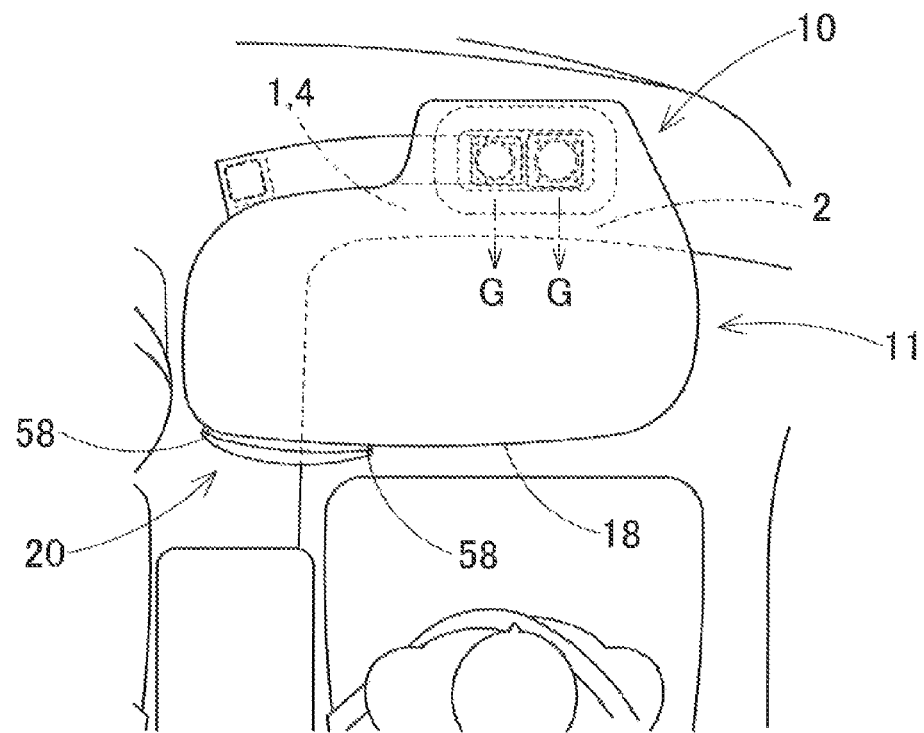
FIGS. 14A and 14B are schematic plan views of the airbag device of FIG. 1 illustrating the behavior at airbag deployment.
Figure 14B:
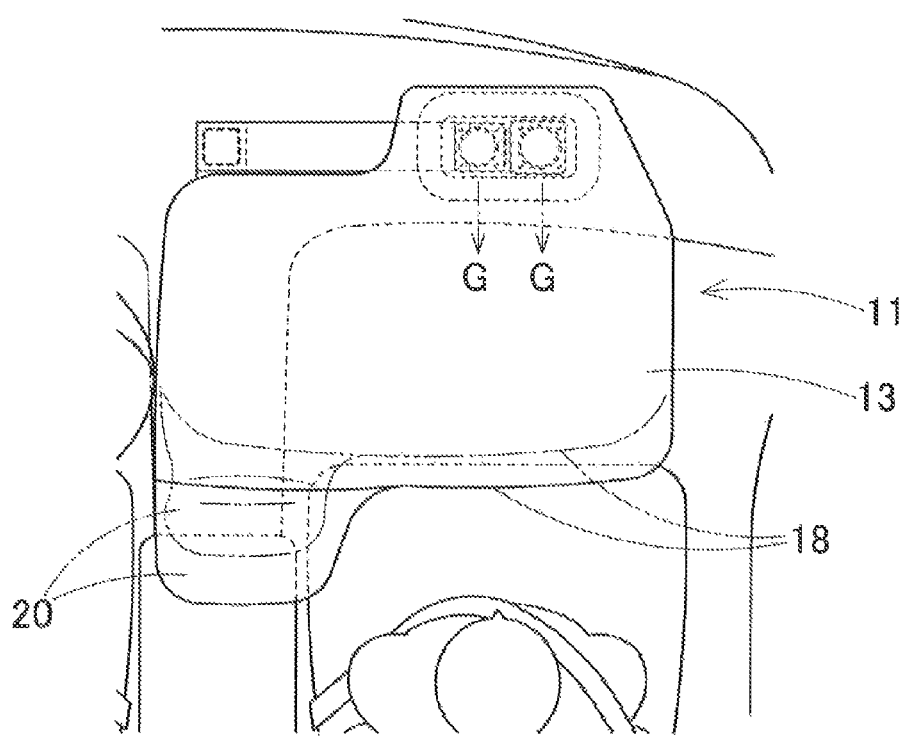

In an initial stage of airbag deployment, as shown in FIGS. 13A and 14A, the sewing threads 58 serving as the holding means will hold the auxiliary bag section 20 from protruding out of the front-collision arresting plane 18 of the main bag section 13. Accordingly, the main bag section 13 will be inflated before the auxiliary bag section 20 starts inflation, and the main bag section 13 will be able to substantially complete deployment of the front-collision arresting plane 18 without oscillating in a left and right direction. Thereafter, as shown in FIGS. 13B and 14B, the auxiliary bag section 20 will be allowed to protrude out of the front-collision arresting plane 18, which has substantially completed deployment, thus the airbag 11 will reach its fully deployed contour quickly without oscillating in a left and right direction during the course of deployment. Therefore, the airbag device 10 for a front passenger seat of the embodiment is able to prevent the airbag 11 from oscillating in a left and right direction during deployment and bring the airbag 11 to full deployment quickly.

The fully deployed airbag 11 will cushion the upper body UB and head H of the passenger PM adequately with the front-collision arresting plane 18 and oblique-collision arresting plane 22 as indicated with double-dotted lines in FIG. 2.

In the airbag device 10 of the foregoing embodiment, the sewing threads 58 serving as the holding means sew the folded-up auxiliary bag body 60 of the auxiliary bag section 20 temporarily to the main bag section 13. The folded-up auxiliary bag body 60 is the folded-up configuration of the auxiliary bag section 20 folded up forward such that its circumferential wall (rear wall 21a) is flush with the front-collision arresting plane 18.

Since the auxiliary bag section 20 is folded up forward into the folded-up auxiliary bag body 60 such that the rear wall 21a (the circumferential wall) is flush with the front-collision arresting plane 18 and is temporarily jointed to the main bag section 13 with the sewing threads 58 (i.e., the holding means), after the main bag section 13 has completed deployment of the front-collision arresting plane 18 at airbag deployment, the temporary joint will be undone (i.e., the sewing threads 58 will be broken so the seams 61 and 62 be broken), such that the folded-up auxiliary bag body 60 will be unfolded and the auxiliary bag section 20 will be deployed rearward in such a manner as to protrude out of the front-collision arresting plane 18. That is, the auxiliary bag section 20 will be able to protrude steadily rearward out of the front-collision arresting plane 18 having completed deployment, such that the airbag 11 will be able to reach its fully deployed contour quickly without oscillating in a left and right direction.

In the foregoing embodiment, especially, the folded-up auxiliary bag body 60 is formed by folding up the circumferential wall of the auxiliary bag section 20 around the rear wall 21a, i.e., the left side wall 21b, the right side wall 21c, the upper wall 21d and lower wall 21e, in front of the rear wall 21a such that the rear wall 21a (i.e., the rear plane 20a of the auxiliary bag section 20 as deployed) is flush with the front-collision arresting plane 18, and the edges 21aa and 21ab of the rear wall 21a of the auxiliary bag section 20 is temporarily jointed to the upper wall 14c and lower wall 14d of the main bag section 13.

With this configuration, when the folded-up auxiliary bag body 60 (the in-folded region 60a) unfolds and the auxiliary bag section 20 protrudes rearward out of the front-collision arresting plane 18 of the main bag section 13 after the front-collision arresting plane 18 has substantially completed deployment at airbag deployment, the rear wall 21a of the auxiliary bag section 20 having been flush with the front-collision arresting plane 18 will move rearward generally in parallel to the front-collision arresting plane 18, such that the auxiliary bag section 20 itself will be deployed without oscillating in a left and right direction. As a consequence, the whole airbag 11 will be prevented from oscillating in a left and right direction during deployment and reach its full deployed contour quickly.

Further, the folded-up auxiliary bag body 60 is temporarily jointed to the main bag section 13 with the sewing threads 58 serving as the holding means by sewing.

With this configuration, by being jointed at adequate locations, the folded-up auxiliary bag body 60 (auxiliary bag section 20) will be jointed temporarily to the main bag section 13 in a steady folded-up configuration, and the timing of deployment of the auxiliary bag section 20 out of the front-collision arresting plane 18 will be steady as well.

Furthermore, as shown in FIGS. 5 to 7C, in the airbag device 10 of the foregoing embodiment, the folded-up body 70 of the airbag 11 is folded up through the folding process composed of the initial folding step 70 for forming the initial folded-up body 64, the left-right contraction step for forming the left-right contracted body 67 and the front-rear contraction step for completing the folded-up body 70. In the initial folding step, as shown in FIG. 5, the rear plane 13b of the airbag 11 as fully deployed is superimposed in a flat fashion on the vicinity of the inlet ports 16 and 16A of an inflation gas G and the mounting section 15 disposed therearound for mounting on the case (housing) 32, thus forming the initial folded-up body 64. In the left-right contraction step, as shown in FIGS. 6A and 6B, the left and right edges 64b and 64c of the initial folded-up body 64 are folded back towards the inlet ports 16 and 16A to form the left-right contracted body 67 which is sized to the width CW (FIG. 12) in a left and right direction of the housing 32. In the front-rear contraction step, as shown in FIGS. 7A to 7C, the front and rear edges 67a and 67b of the left-right contracted body 67 are folded back towards the inlet ports 16 and 16A to complete the folded-up body 70 which is sized to the width CL (FIG. 12) in a front and rear direction of the case 32.

In the left-right contracted body 67, furthermore, as shown in FIG. 6B, the left edge region 64b of the initial folded-up body 64 where the folded-up auxiliary bag body 60 is disposed is so folded up that the left side wall 14a (circumferential wall) of the main bag section 13 on the back side 64d of the initial folded-up body 64 wraps the folded-up auxiliary bag body 60 on the surface 64e of the initial folded-up body 64.

With this configuration, since the folded-up auxiliary bag body 60 is wrapped and covered by the left side wall 14a of the man bag section 13 in the left-right contraction step, at airbag deployment, the auxiliary bag section 20 will be held from deploying rearward and protruding out of the front-collision arresting plane 18 until the airbag 11 unfolds the fold done in the front-rear contraction step and the fold done in the left-right contraction step and the left side wall 14a uncovers the folded-up auxiliary bag body 60. Therefore, this configuration will further help secure the deployment timing of the auxiliary bag section 20 after the front-collision arresting plane 18 has substantially completed deployment in a steady fashion.

In the foregoing embodiment, the left-right contracted body 67 has such a configuration that the left edge region 64b of the initial folded-up body 64 where the folded-up auxiliary bag body 60 is disposed is folded back twice by the irregular rolling as shown in FIG. 6B in order that the left side wall 14a of the main bag section 13, which forms the back side 64d of the initial-folded body 64, wraps the folded-back auxiliary bag body 60 on the surface 64e of the initial folded body 64. However, as shown in a parenthesis on the right side of FIG. 6B, the left edge region 64b of the initial folded-up body 64 may be rolled on the surface 64e of the initial folded body 64 by a regular rolling to form a left-right contracted body 67k In the left-right contracted body 67A as well, the left edge region 64b of the initial folded-up body 64 where the folded-up auxiliary bag body 60 is disposed is so folded up that the left side wall 14a of the main bag section 13, which forms the back side 64d of the initial-folded body 64, wraps the folded-back auxiliary bag body 60 on the surface 64e of the initial folded body 64. Also with this configuration, at airbag deployment, the auxiliary bag section 20 will be held from protruding out of the front-collision arresting plane 18 until the airbag 11 unfolds the folds done in the front-rear contraction step and the left-right contraction step and the left side wall 14a uncovers the folded-up auxiliary bag body 60.

In the foregoing embodiment, furthermore, the folded-up body 70 of the airbag 11 as housed in the case (housing) 32 has the folded-up auxiliary bag body 60 in the left region 70g (i.e., in either left or right region) and is wrapped by the wrapping sheet 45 which is tearable at airbag deployment. The wrapping sheet 45 includes on the ceiling region 46 covering the ceiling plane (upper plane) 70a of the folded-up body 70 the tearable section 47 which includes a plurality of the slits 48a, 48b and 48c extending in a left and right direction in a interspaced fashion. In the left region 46a (i.e., in the either left or right region) where the folded-up auxiliary bag body 60 is disposed, the distance between the slits is smaller than that in the right region 46b where the folded-up auxiliary bag body 60 is not disposed.

This configuration will make the tearable region 47b on the left side of the tearable section 47 on the part of the folded-up auxiliary bag body 60 easier to break than the tearable region 47a on the right side, and will help deploy the part of airbag 11 in which the folded-up auxiliary bag body 60 is disposed quickly out of the case 32 in the initial stage of airbag deployment. That is, although the region of the airbag 11 on the part of the folded-up auxiliary bag body 60 has more amount of base cloths, the region will emerge out of the case 32 quickly, which will help deploy the main bag section 13 in a balanced fashion in a left and right direction, deploy the front-collision arresting plane 18 smoothly, thus deploying the auxiliary bag section 20 at a predetermined timing.

Figure 15A:
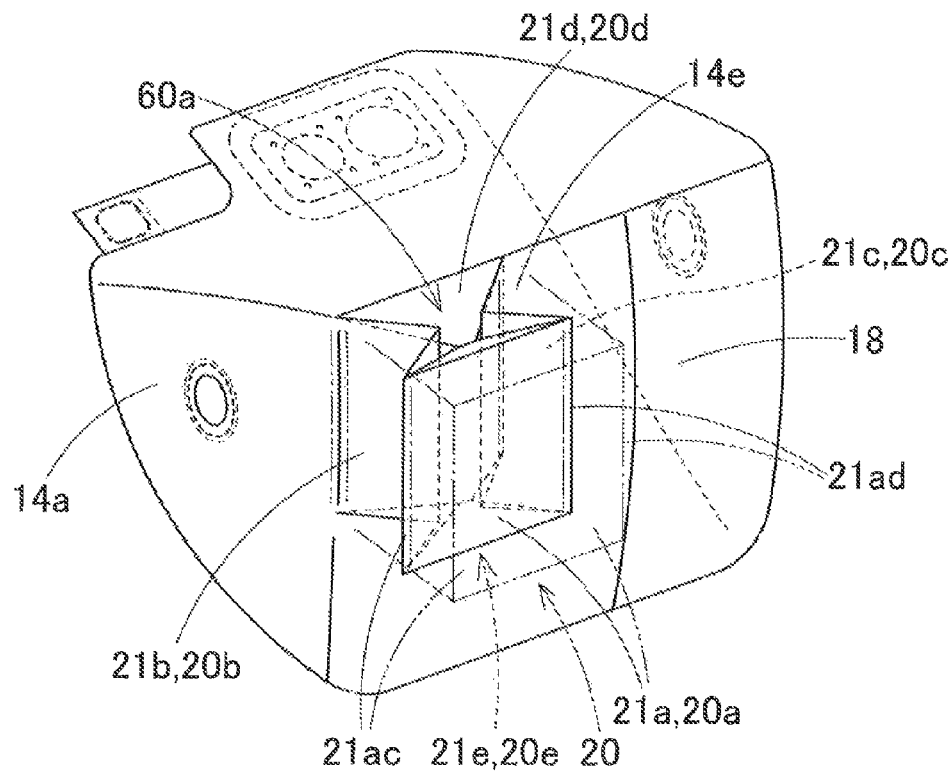
FIGS. 15A and 15B illustrate an alternative configuration of the temporary joint.
Figure 15B:
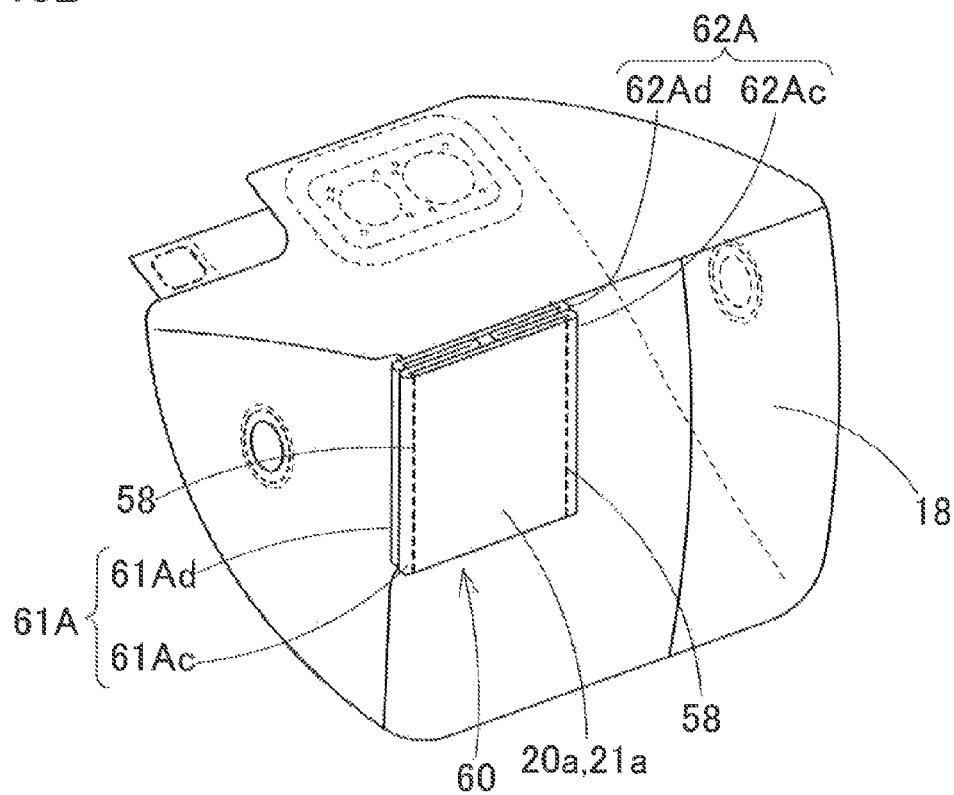

In the foregoing embodiment, when the folded-up auxiliary bag body 60 is temporarily jointed to the main bag section 13 by sewing, it is sewn to the main bag section 13 by the upper edge 21aa and lower edge 21ab of the generally rectangular rear wall 21a extending in a left and right direction by the tearable sewing threads 58. However, as shown in FIGS. 15A and 15B, the folded-up auxiliary bag body 60 may also be formed by folding up the left side wall 21b, right side wall 21c, upper wall 21d and lower wall 21e, which adjoin the rear wall 21a, in front of the rear wall 21a and be temporarily jointed or sewn to the main bag section 13 by the left edge 21ac and right edge 21ad of the rear wall 21a with sewing threads 58, forming seams 61A and 62A.

The seam 61A sews a rear left tucked region 61Ac, which is formed by pinching together the rear wall 21a and left side wall 21b in a vicinity of the left edge 21ac, to a front left tucked region 61Ad, which is formed by pinching together the left side wall 21b and the left side wall 14a of the main bag section 13 in a vicinity of the left side wall 21b, at the left edge 21ac. The seam 62A sews a rear right tucked region 62Ac, which is formed by pinching together the rear wall 21a and right side wall 21c in a vicinity of the right edge 21ad, to a front right tucked region 62Ad; which is formed by pinching together the right side wall 21c and the rear wall 14e of the main bag section 13 in a vicinity of the right side wall 21c, at the right edge 21ad. In other words, the seam 61A sews the left edge 21ac of the rear plane 20a of the auxiliary bag section 20 to the left side wall 14a of the main bag section 13 in a vicinity of the auxiliary bag section 20 while the seam 62A sews the right edge 21ad of the rear plane 20a of the auxiliary bag section 20 to the rear wall 14e of the main bag section 13 in a vicinity of the auxiliary bag section 20.

Figure 16A:
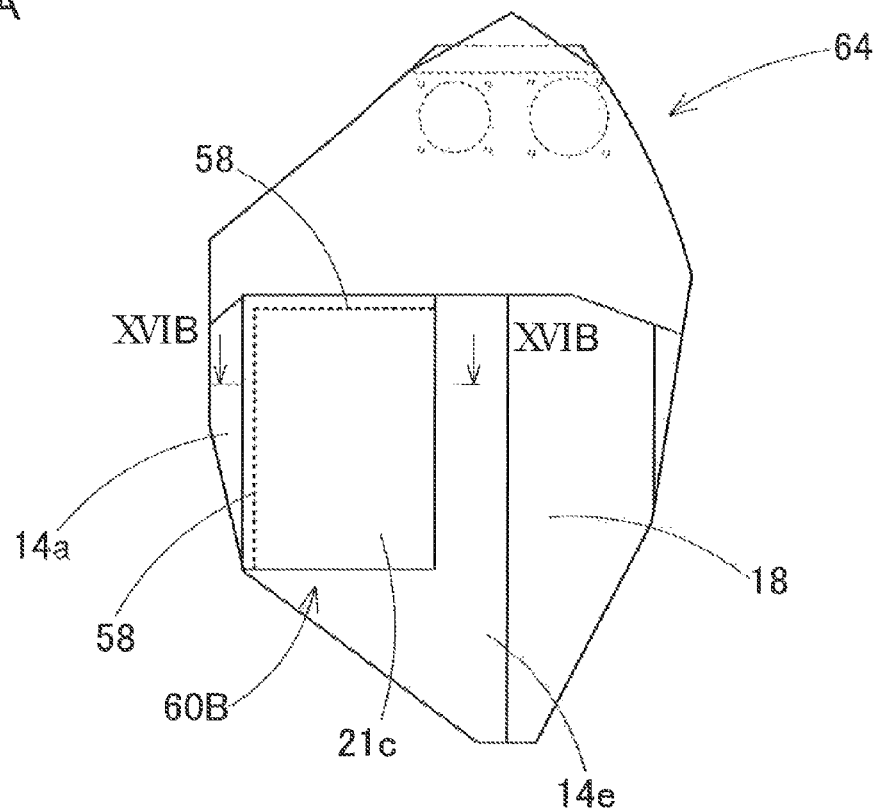
FIG. 16A illustrates another alternative configuration of the temporary joint.
Figure 16B:
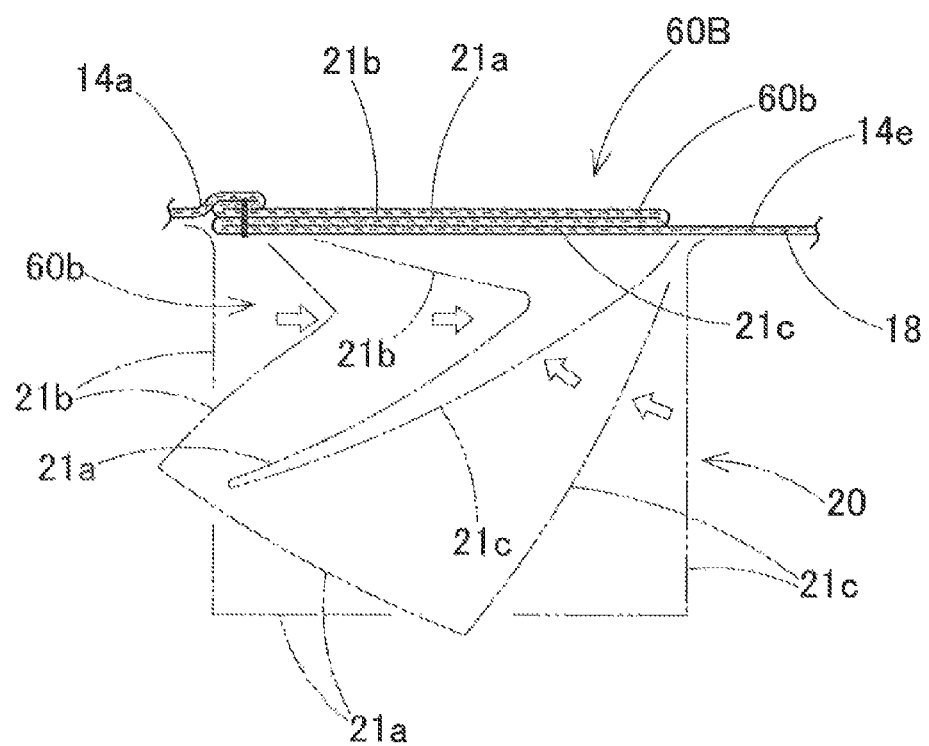
FIG. 16B is a schematic sectional view taken along line XVIB-XVIB of FIG. 16A.

Alternatively, three sides or all sides out of the upper, lower, left and right edges 21aa, 21ab, 21ac and 21ad of the rear wall 21a may be sewn to the main bag section 13 with the sewing threads 58 when the rear wall 21a of the auxiliary bag section 20 is temporarily jointed (sewn) to the main bag section 13 after folding up the circumferential wall around the rear wall 21a in front of the rear wall 21a, FIGS. 16A and 16B depict an alternative configuration of the folded-up auxiliary bag body. The folded-up auxiliary bag body 60B is formed by folding up the rear wall 21a and left side wall 21b adjoining the rear wall 21a, by way of example, in front of the right side wall 21c such that an in-folded region 60b is formed and the right side wall 21c is located rearmost. The folded-up auxiliary bag body 60B is temporarily jointed to the main bag section 13 with sewing threads 58 by its peripheral edge.

When the folded-up auxiliary bag body 60/60B, which is formed by forming the in-folded region 60a/60b in front of the rear wall 21a, right side wall 21c or left side wall 21b of the auxiliary bag section 20, is jointed to two or more positions out of the upper wall 14c, rear wall 14e and left side wall 14a of the main bag section 13 in a vicinity of the auxiliary bag section 20, the folded-up auxiliary bag body 60/60B may be jointed to the main bag section 13 in a detachable fashion with an adhesive serving as the holding means, instead of sewing threads 58.

Further alternatively, when the folded-up auxiliary bag body 60/60B is formed by forming the in-folded region 60a/60b in front of the rear wall 21a or right side wall 21c of the auxiliary bag section 20, the holding means may be composed of a tearable tether which joints the mounting section 15 of the main bag section 13 and the rear wall 21a or right side wall 21c in order to temporarily joint the folded-up auxiliary bag body 60/60B to the main bag section 13.

These configurations will also enable the auxiliary bag section 20 to deploy rearward after the front-collision arresting plane 18 is deployed.

In the above instance, the auxiliary bag section 20 may be so folded up forward that the upper wall 21d, lower wall 21e or left side wall 21b is located rearmost. In that instance, a peripheral edge of the in-folded region in the outer peripheral edge of the folded-up auxiliary bag body may be sewn or adhered to the main bag section. A tearable tether may also be used to joint the rear plane of the upper wall 21d, lower wall 21e or left side wall 21b to the mounting section 15 of the main bag section 13 to temporarily joint the auxiliary bag section 20 to the main bag section 13.

In the foregoing embodiment, the folded-up auxiliary bag body 60 is formed before forming the initial folded-up body 64, i.e., folding up the airbag 11. However, the folded-up auxiliary bag body 60 may also be formed after the initial folding step and before the left-right contraction step during the course of airbag folding process.

Although the auxiliary bag section 20 in the foregoing embodiment is disposed in the region of the main bag section 13 adapted to face towards the driver's seat, it may be disposed in an outboard side region of the main bag section for catching the head of a passenger as moves diagonally forward and toward an exterior of the vehicle.

What is claimed is:

1. An airbag device for a front passenger seat comprising:
   a housing adapted to be mounted in front of a front passenger seat of a vehicle;
   an airbag that is housed in the housing in a folded-up configuration and inflatable with an inflation gas to emerge out of the housing and be deployed rearward, the airbag including:
      a main bag section that includes at a rear plane thereof as deployed a front-collision arresting plane for catching a passenger that moves forward;
      an auxiliary bag section that is deployable in such a manner as to protrude rearward out of either a left region or a right region of the front-collision arresting plane, the auxiliary bag section including an oblique-collision arresting plane, the oblique-collision arresting plane is disposed on a lateral of the auxiliary bag section for catching the passenger that moves diagonally forward, the oblique-collision arresting plan extends from the front-collision arresting plane and faces towards the front-collision arresting plane; and
      a folded-up body that is the folded-up configuration of the airbag, the folded-up body including a holding means for preventing the auxiliary bag section from protruding out of the front-collision arresting plane in an initial stage of airbag deployment in which the airbag emerges out of the housing.

2. The airbag device for a front passenger seat of claim 1, wherein:
   the folded-up body includes a folded-up auxiliary bag body that is a folded-up configuration of the auxiliary bag section folded up forward such that a circumferential wall of the auxiliary bag section is flush with the front-collision arresting plane; and
   the holding means is a means for temporarily jointing the folded-up auxiliary bag body to the main bag section.

3. The airbag device for a front passenger seat of claim 2, wherein:
   the auxiliary bag section includes a rear wall which forms a rear plane of the auxiliary bag section as fully deployed and a circumferential wall disposed around the rear wall;
   the folded-up auxiliary bag body is formed by folding up the circumferential wall in front of the rear wall such that the rear wall is flush with the front-collision arresting plane; and
   an edge of the rear wall of the auxiliary bag section is temporarily jointed to the main bag section.

4. The airbag device for a front passenger seat of claim 2, wherein the holding means is composed of a tearable sewing thread that temporarily joints the folded-up auxiliary bag body to the main bag section by sewing.

5. The airbag device for a front passenger seat of claim 3, wherein the holding means is composed of a tearable sewing thread that temporarily joints the folded-up auxiliary bag body to the main bag section by sewing.

6. The airbag device for a front passenger seat of claim 2, wherein:
   the airbag includes an inlet port for introducing an inflation gas into the airbag and a mounting section disposed in a periphery of the inlet port for mounting on the housing;
   the folded-up body of the airbag is formed through a folding process composed of:
      an initial folding step of superimposing a rear plane of the airbag as fully deployed on a vicinity of the inlet port and the mounting section in a flat fashion to form such an initial folded-up body that the folded-up auxiliary bag body is disposed on the either left or right region of the initial folded-up body;
      a left-right contraction step of folding back left and right edges of the initial folded-up body towards the inlet port to form a left-right contracted body which is sized to a width in a left and right direction of the housing; and
      a front-rear contraction step of folding back front and rear edges of the left-right contracted body towards the inlet port to complete the folded-up body which is sized to a width in a front and rear direction of the housing; and
   in the either left or right region of the left-right contracted body where the folded-up auxiliary bag body is disposed, a circumferential wall of the main bag section on a back side of the initial folded-up body wraps the folded-up auxiliary bag body on a surface of the initial folded-up body.

7. The airbag device for a front passenger seat of claim 3, wherein:
   the airbag includes an inlet port for introducing an inflation gas into the airbag and is mounted on the housing at a periphery of the inlet port;
   the folded-up body of the airbag is formed through a folding process composed of:
      an initial folding step of superimposing a rear plane of the airbag as fully deployed on a vicinity of the inlet port in a flat fashion to form such an initial folded-up body that the folded-up auxiliary bag body is disposed on the either left or right region of the initial folded-up body;
      a left-right contraction step of folding back left and right edges of the initial folded-up body towards the inlet port to form a left-right contracted body which is sized to a width in a left and right direction of the housing; and
      a front-rear contraction step of folding back front and rear edges of the left-right contracted body towards the inlet port to complete the folded-up body which is sized to a width in a front and rear direction of the housing; and
   in the either left or right region of the left-right contracted body where the folded-up auxiliary bag body is disposed, a circumferential wall of the main bag section on a back side of the initial folded-up body wraps the folded-up auxiliary bag body on a surface of the initial folded-up body.

8. The airbag device for a front passenger seat of claim 4, wherein:
   the airbag includes an inlet port for introducing an inflation gas into the airbag and is mounted on the housing at a periphery of the inlet port;
   the folded-up body of the airbag is formed through a folding process composed of:
      an initial folding step of superimposing a rear plane of the airbag as fully deployed on a vicinity of the inlet port in a flat fashion to form such an initial folded-up body that the folded-up auxiliary bag body is disposed on the either left or right region of the initial folded-up body;
      a left-right contraction step of folding back left and right edges of the initial folded-up body towards the inlet port to form a left-right contracted body which is sized to a width in a left and right direction of the housing; and a front-rear contraction step of folding back front and rear edges of the left-right contracted body towards the inlet port to complete the folded-up body which is sized to a width in a front and rear direction of the housing; and in the either left or right region of the left-right contracted body where the folded-up auxiliary bag body is disposed, a circumferential wall of the main bag section on a back side of the initial folded-up body wraps the folded-up auxiliary bag body on a surface of the initial folded-up body.

9. The airbag device for a front passenger seat of claim 5, wherein:

the airbag includes an inlet port for introducing an inflation gas into the airbag and is mounted on the housing at a periphery of the inlet port;

the folded-up body of the airbag is formed through a folding process composed of:

an initial folding step of superimposing a rear plane of the airbag as fully deployed on a vicinity of the inlet port in a flat fashion to form such an initial folded-up body that the folded-up auxiliary bag body is disposed on the either left or right region of the initial folded-up body;

a left-right contraction step of folding back left and right edges of the initial folded-up body towards the inlet port to form a left-right contracted body which is sized to a width in a left and right direction of the housing; and a front-rear contraction step of folding back front and rear edges of the left-right contracted body towards the inlet port to complete the folded-up body which is sized to a width in a front and rear direction of the housing; and in the either left or right region of the left-right contracted body where the folded-up auxiliary bag body is disposed, a circumferential wall of the main bag section on a back side of the initial folded-up body wraps the folded-up auxiliary bag body on a surface of the initial folded-up body.

10. The airbag device for a front passenger seat of claim 6 further comprising:

a wrapping sheet that is tearable at airbag deployment and wraps the folded-up body of the airbag which has the folded-up auxiliary bag body in the either left or right region; and a tearable section that is disposed on a region of the wrapping sheet covering an upper plane of the folded-up body, the tearable section including a plurality of slits extending in a left and right direction in a interspaced fashion, wherein a distance between the slits is smaller in the either left or right region where the folded-up auxiliary bag body is disposed than in the other region where the folded-up auxiliary bag body is not disposed.

11. The airbag device for a front passenger seat of claim 7 further comprising:

a wrapping sheet that is tearable at airbag deployment and wraps the folded-up body of the airbag which has the folded-up auxiliary bag body in the either left or right region; and a tearable section that is disposed on a region of the wrapping sheet covering an upper plane of the folded-up body, the tearable section including a plurality of slits extending in a left and right direction in a interspaced fashion, wherein a distance between the slits is smaller in the either left or right region where the folded-up auxiliary bag body is disposed than in the other region where the folded-up auxiliary bag body is not disposed.

12. The airbag device for a front passenger seat of claim 8 further comprising:

a wrapping sheet that is tearable at airbag deployment and wraps the folded-up body of the airbag which has the folded-up auxiliary bag body in the either left or right region; and a tearable section that is disposed on a region of the wrapping sheet covering an upper plane of the folded-up body, the tearable section including a plurality of slits extending in a left and right direction in a interspaced fashion, wherein a distance between the slits is smaller in the either left or right region where the folded-up auxiliary bag body is disposed than in the other region where the folded-up auxiliary bag body is not disposed.

13. The airbag device for a front passenger seat of claim 9 further comprising:

a wrapping sheet that is tearable at airbag deployment and wraps the folded-up body of the airbag which has the folded-up auxiliary bag body in the either left or right region; and a tearable section that is disposed on a region of the wrapping sheet covering an upper plane of the folded-up body, the tearable section including a plurality of slits extending in a left and right direction in a interspaced fashion, wherein a distance between the slits is smaller in the either left or right region where the folded-up auxiliary bag body is disposed than in the other region where the folded-up auxiliary bag body is not disposed.

* * * * *